(12) United States Patent
Semple et al.

(10) Patent No.: US 11,641,096 B2
(45) Date of Patent: May 2, 2023

(54) ELECTRICAL BOX CABLE MANAGEMENT AND SUPPORT BRACKET ASSEMBLY, SYSTEM AND METHOD

(71) Applicant: EATON INTELLIGENT POWER LIMITED, Dublin (IE)

(72) Inventors: Shane Semple, Cecil, PA (US); Ronald Conroy, Liverpool, NY (US); Gary Stephen Stasonis, Pulaski, NY (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 657 days.

(21) Appl. No.: 16/563,494

(22) Filed: Sep. 6, 2019

(65) Prior Publication Data

US 2020/0266617 A1 Aug. 20, 2020

Related U.S. Application Data

(60) Provisional application No. 62/871,257, filed on Jul. 8, 2019, provisional application No. 62/807,130, filed on Feb. 18, 2019.

(51) Int. Cl.
*H02G 3/12* (2006.01)
*H02G 3/08* (2006.01)

(52) U.S. Cl.
CPC ............ *H02G 3/125* (2013.01); *H02G 3/081* (2013.01)

(58) Field of Classification Search
CPC .......... H02G 3/125; H02G 3/10; H02G 3/123; H02G 3/121; H02G 3/08; H02G 3/081; H02G 3/16

USPC .......................... 220/3.9, 3.92; 248/65, 67.7
See application file for complete search history.

(56) References Cited

U.S. PATENT DOCUMENTS

| | | | |
|---|---|---|---|
| 2,831,222 A | 4/1958 | Anderson | |
| 5,005,792 A * | 4/1991 | Rinderer | H02G 3/125 248/906 |
| 5,810,303 A * | 9/1998 | Bourassa | H02G 3/126 248/300 |
| 6,723,918 B2 * | 4/2004 | Vrame | H02G 3/123 174/64 |
| D502,388 S | 3/2005 | Cortez et al. | |
| 7,053,300 B2 * | 5/2006 | Denier | H02G 3/18 220/3.9 |
| D612,226 S | 3/2010 | Dinh | |
| D613,150 S | 4/2010 | Rieder et al. | |

(Continued)

*Primary Examiner* — Rafael A Ortiz
(74) *Attorney, Agent, or Firm* — Squire Patton Boggs (US) LLP

(57) ABSTRACT

An electrical box assembly is provided. The electrical box assembly includes an electrical box and a support bracket positioned proximate the back wall of the electrical box and coupled to the electrical box. The support bracket includes a plate member and a cable management member extending laterally from the plate member and forming at least one pass-through opening sized to receive an electrical cable. The plate member includes a bending line that divides the plate member into a first portion and a second portion. The plate member has first and second configurations. The plate member is generally planar in the first configuration. When the plate member is in the second configuration, the first portion of the plate member bends along the bending line and extends laterally from the second portion to engage a second wall opposing the first wall and opposing the back wall of the electrical box.

17 Claims, 38 Drawing Sheets

(56) References Cited

U.S. PATENT DOCUMENTS

| | | | |
|---|---|---|---|
| 8,424,827 B2* | 4/2013 | Dinh | H02G 3/081 |
| | | | 220/3.9 |
| D801,783 S | 11/2017 | Riner | |
| D902,026 S | 11/2020 | OHare | |
| 2017/0077689 A1* | 3/2017 | Korcz | H02G 3/123 |
| 2017/0256928 A1* | 9/2017 | Korcz | H02G 3/125 |
| 2020/0200714 A1 | 6/2020 | Nixon | |
| 2020/0266617 A1 | 8/2020 | Semple et al. | |

* cited by examiner

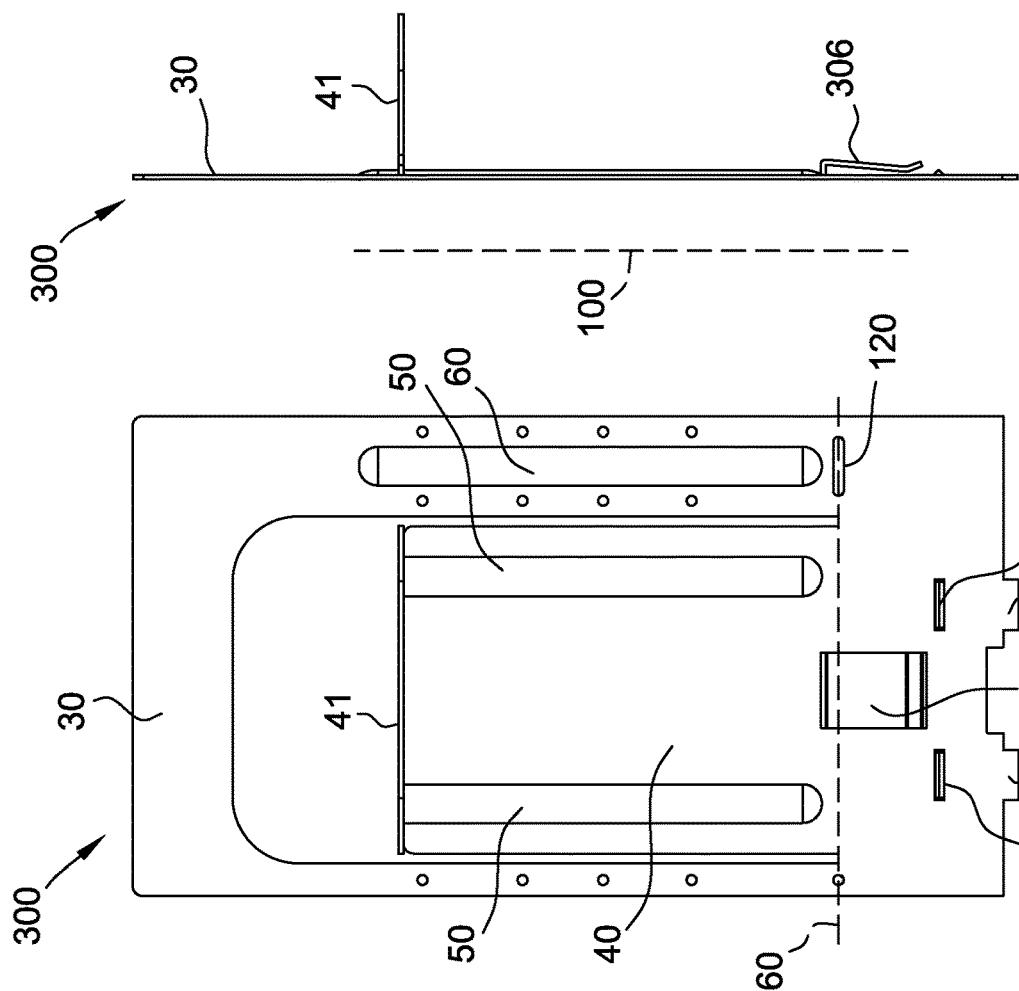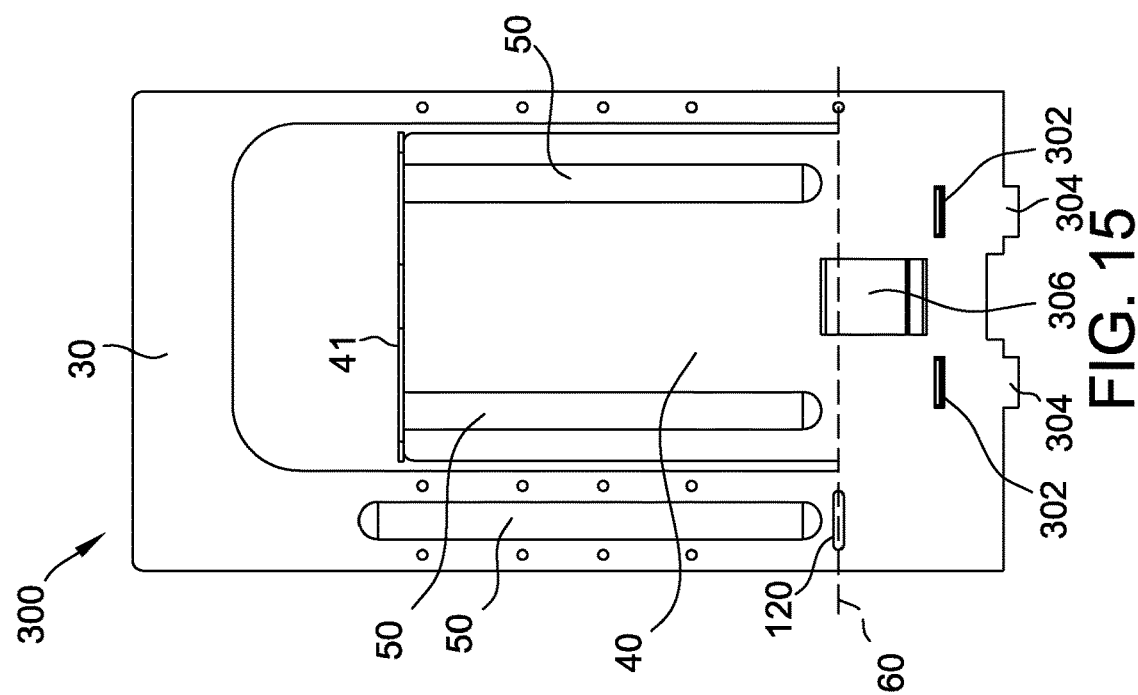

ELECTRICAL BOX CABLE MANAGEMENT AND SUPPORT BRACKET ASSEMBLY, SYSTEM AND METHOD

CROSS REFERENCE TO RELATED APPLICATIONS

This application claims the benefit of U.S. Provisional Application No. 62/807,130, filed Feb. 18, 2019, and U.S. Provisional Patent Application No. 62/871,257, filed Jul. 8, 2019, the entire contents and disclosures of which are hereby incorporated by reference herein in their entirety.

BACKGROUND

The field of the disclosure relates generally to electrical box assemblies for in-wall electrical wiring, and more specifically to an electrical box assembly including a support bracket that provides containment for electrical cables and/or support for the electrical box.

Electrical boxes, sometimes referred to as junction boxes, are typically attached to walls or other support structures to receive distal ends of in-wall wiring that may be terminated to an electrical component or components such as a socket, outlet, or switch component mounted inside the electrical box. Existing solutions for attaching electrical boxes to a support include wall mounting plates, mounting brackets, or direct attachment using fasteners or studs.

Also, some attempt has been made to introduce brackets having cable management features to assist in properly positioning cables and improving the reliability of termination of the cables to an electrical box, but such mechanisms can be cumbersome to use and tend to complicate the electrical box assembly at an undesirable economic cost.

Improved support brackets for electrical box assemblies that are more user-friendly, cost effective, and versatile are accordingly desired.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

FIG. 15 is a front view of the bracket shown in FIG. 13.

FIG. 16 is a rear view of the bracket shown in FIG. 13.

FIG. 17 is a side view of the bracket shown in FIG. 13.

DETAILED DESCRIPTION

Figure 1A:
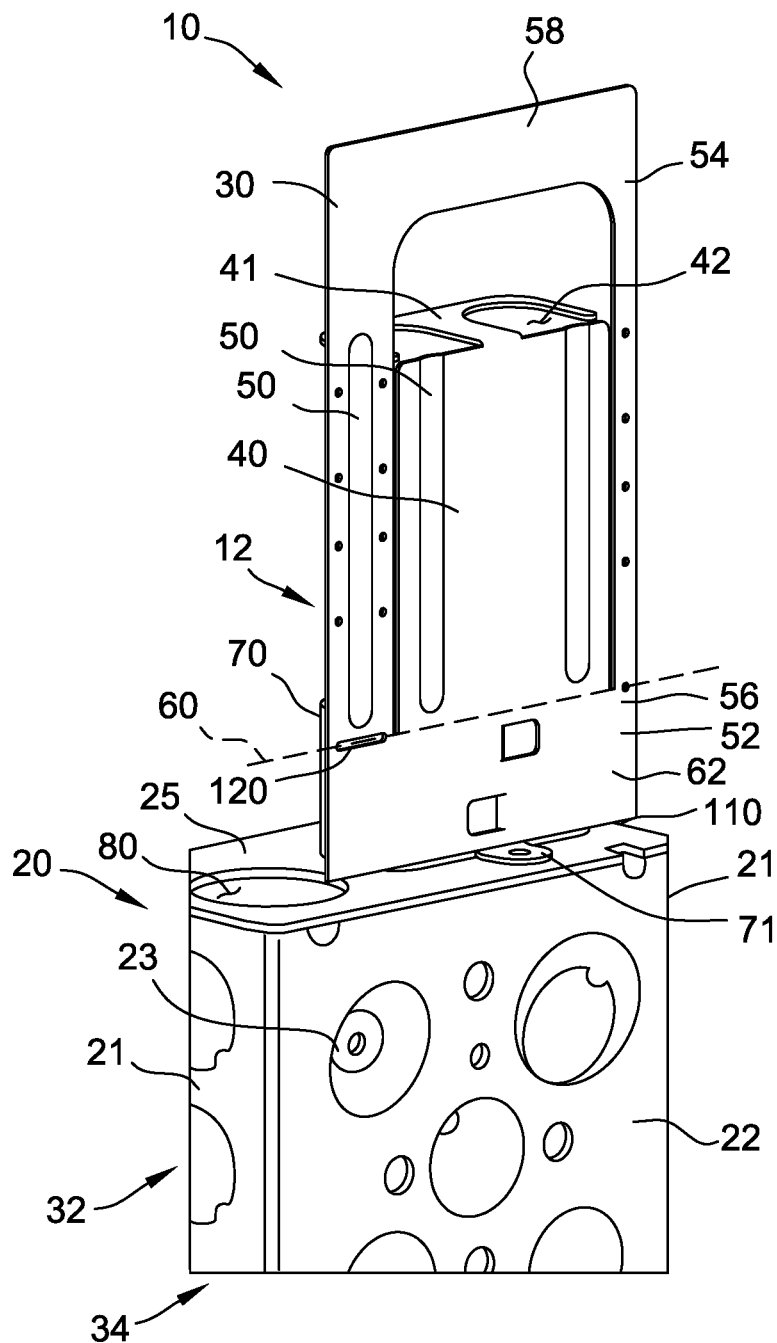
FIG. 1A is a partial rear perspective view of an exemplary electrical box assembly.

In order to understand the inventive concepts described herein to their fullest extent, some discussion of the state of the art and certain problems and disadvantages concerning electrical box assemblies and installations is set forth below, followed by exemplary embodiments of electrical box assemblies and support systems overcoming such problems and disadvantages in the art.

Various types of mounting and support brackets have been developed for electrical boxes. Certain types of brackets are support brackets and are separately provided from the mounting bracket that secures an electrical box to a front or first wall. Such support boxes may be directly attached to a sidewall of the electrical box and extend rearward beyond the back wall of the electrical box to provide support for the electrical box against a rear or second wall opposing the first wall to which the electrical box has been mounted. Such support brackets are effective to secure the electrical box in position but can present difficulties in installation. Particularly for support brackets extending on or alongside the back wall of an electrical box that provide no clear line of sight during installation, some trial and error to properly position the bracket may be incurred, including removal of the electrical box and fastening and unfastening of the bracket with a tool.

Further, different spacing distances exist between the back wall of an electrical box (as mounted to the first wall) and the opposing second wall, for different installations. The support brackets should bend at an adjustable length to provide an appropriate length for supporting the electrical box against forces that push the electrical box into the wall cavity.

Cable management features are integrated in some support bracket designs for electrical box assemblies. Such cable management features can assist with maintaining an optimal position of the cables relative to the electrical box and therefore improve reliability of the cable terminations to the electrical box, but also present some complications from an installation perspective. Particularly for brackets including adjustable cable management features that are movable between different positions on the bracket in use, such movement of the cable management features can present unintended difficulties to an installer to use them properly. Specifically, such movable features can be non-intuitive to certain installers and if not correctly used can undesirably render installation steps more difficult rather than less, and can also be subject to inadvertent movement as the electrical box assembly is completed and as cables are terminated. In the best case scenario, inadvertent movement of the cable management features may be detected and corrected, albeit with potential trial and error and dis-assembly to correct. In the worst case scenario, inadvertent movement of the of the cable management features may go undetected and result in sub-optimal positioning of the cables or potentially defeat the purpose of the cable management features altogether.

When back-side support brackets and cable management features are desired in combination, separate brackets to accommodate each feature present still further complications in completing the electrical box assembly by an installer. Such brackets are typically separately fastened to the electrical box and may to some extent interfere with one another in attempts to install and support an electrical box. Mounting multiple brackets to electrical boxes in tight spaces can be time consuming and frustrating. Maintaining an appropriate inventory of mounting brackets for different installations also increases the costs of installation as well as manufacturing costs to provide the boxes.

Integrating back-side support and cable management features in the design of the electrical box would avoid issues with separately provided back-side support and cable management brackets, but would undesirably complicate the manufacture of the electrical box and costs to provide it, rendering the electrical box particularly undesirable when back-side support and cable management features are not deemed to be necessary for a given installation. Attempts to integrate back-side support or cable management features in mounting brackets for electrical boxes tends to result in overly complicated and relatively expensive brackets whose features may not be desired or could not be used in certain installations.

Simpler and more cost effective support brackets for electrical box assemblies which are more intuitive and easier to install are therefore desired that may more flexibly meet the needs of different installations.

Exemplary embodiments of support brackets and electrical box assemblies are described below that advantageously simplify assembly and installation by virtue of support brackets featuring a slidable clip-on attachment feature that may be quickly and easily attached and detached in an indirect manner to and from an electrical box without requiring fasteners such as screws. Support brackets offering back-side support and cable management features may be indirectly attached to a top side of the electrical box through a mounting connector base that is in turn secured to the electrical box with a fastener such as a screw. The support bracket includes a back-side support member having the ability to simply bend perpendicular to the back wall of the electrical box and toward a rear support wall to provide back-side support for the electrical box. Cable management features are also provided in the support brackets that remain stationary and in place as the cable box assembly is completed. The electrical box assemblies disclosed herein may further include a connector mounting base. The connector mounting base retains and secures the cables to the electrical box. Convenient access to the clip-on bracket features on the top wall of the electrical box facilitates ease of installation in a reduced amount of time. Support brackets described herein may also be configured for direct attachment to the electrical box, and be configurable in multiple configurations for engaging a second wall surface at different depths in the wall cavity to support the electrical box against forces that push the electrical box into the wall cavity.

While described below in reference to particular embodiments, such description is intended for the sake of illustration rather than limitation. The significant benefit of the inventive concepts will now be explained in reference to the exemplary embodiments illustrated in the Figures. Method aspects will be in part apparent and in part explicit in the following discussion.

Referring now to FIGS. 1A-7, an exemplary electrical box assembly 10 (FIGS. 1A-3) is illustrated. The electrical box assembly 10 includes a support bracket 12 and an electrical box 20. The electrical box assembly 10 may further include a connecting mounting base or a sleeve attachment 70. A rear wall support, an interior wall, or a second wall 100 is represented by a dashed-line plane or a dashed line in FIGS. 1B, 2 and 4.

In the exemplary embodiment, the electrical box 20 includes sidewalls 21, a back wall 22, a top wall 25, a bottom wall 34 opposing the top wall 25. The electrical box 20 may further include a front wall 32 opposing the back wall 22. The electrical box 20 may further include a plurality of electrical knock-out plugs 23 and a front opening 24 (shown in FIG. 3) for receiving front wall 32. The top wall 25 includes an opening 80 and additional openings (not shown) to facilitate electrical connections between one or more electrical components (e.g., an outlet, a socket, a receptacle or a switch) accessible from the front of the electrical box 20, and power cables routed to and through the electrical box 20 from inside the walls of a building. Additional openings may be provided in the back wall or the side walls of the electrical box 20 for purposes such as routing cables, mounting of components, or ventilation. The electrical box 20 may be directly secured to a stud of a front wall or a first wall 102 with the front opening of the box being accessible through the front wall 102 using any mounting bracket desired that directly attaches to a stud, or is indirectly attached to a stud of the first wall 102 through the wall covering or other support structure of the wall such as a dry wall.

Support brackets disclosed herein may be made of steel, plastic, or other material that enables the support brackets to function as described herein. Support brackets may be made by the process of stamping.

In the exemplary embodiment, the support bracket 12 includes a plate member 52. The plate member 52 has a back-side support member 30 and a main member 40. The support member 30 and the main member 40 may be generally in a common plane or generally coplanar to one another. The support member 30 may be an inverted, U-shaped element that surrounds the main member 40 on three sides of main member 40. In the example shown, the support member 30 and the main member 40 have a rectangular-shaped profile. They may be are formed from a single sheet of material.

In the exemplary embodiment, the support member 30 and/or main member 40 include support ribs 50. The support ribs 50 may be formed with generally parallel and rounded, out-of-plane structures. The support ribs 50 impart mechanical strength and rigidity to limit bending along the direction of the support ribs 50. The U-shaped support member 30 in the example shown includes two different legs having different width dimensions in the horizontal plane of FIGS. 1A, 1B, 3, 5, 6, and 7 such that the main member 40 is off centered in the support bracket 12, imparting a general asymmetry in the support bracket 12. Alternative and variations are possible in alternative embodiments, including but not limited to legs in the support member 30 having substantially equal width.

In the exemplary embodiment, the main member 40 remains stationary when in use. The main member 40 may further include a cable management member or cable containment flange 41. A requirement in the National Electrical Code is that MC cables be secured within 12 inches (30.5 cm) of an electrical box 20 for cables up to 10 American Wire Gauge (AWG). In the known installations, a separate accessory piece is installed within 12 inches (30.5 cm) of the electrical box, which then wraps around the cable and secures the cable in place. This is a labor-intensive activity and requires ordering separate pieces of miscellaneous material to support the cable. The support brackets disclosed here, however, integrate cable securing mechanism such as the cable management member 41 into the support bracket to secure the cables within the code required distance from the electrical box. This alleviates the trouble of purchasing, handling, and installing separate accessory pieces.

The cable management member 41 may be pre-formed, front facing. The cable management member 41 extends laterally from the main member 40 in a direction away from the second wall 100. In one embodiment, the cable management member 41 is perpendicularly or substantially perpendicular outward from the main member 40. The cable management member 41 is substantially perpendicular to the main member 40 when the angle between the cable management member 41 and the main member 40 is in the range of between 75° and 105°. The cable management member 41 has a plurality of pass-through openings or arch shaped openings 42, for example, two pass-through openings 42, to receive respective cables threaded therethrough. In contemplated embodiments, the main member 40 and the cable management member 41 are sufficiently rigid such that neither of them is intended to move or deflect relative to one another or to the remainder of the support bracket as the cable connections are completed to the connector mounting base 70 in the electrical box assembly 10.

Figure 1B:
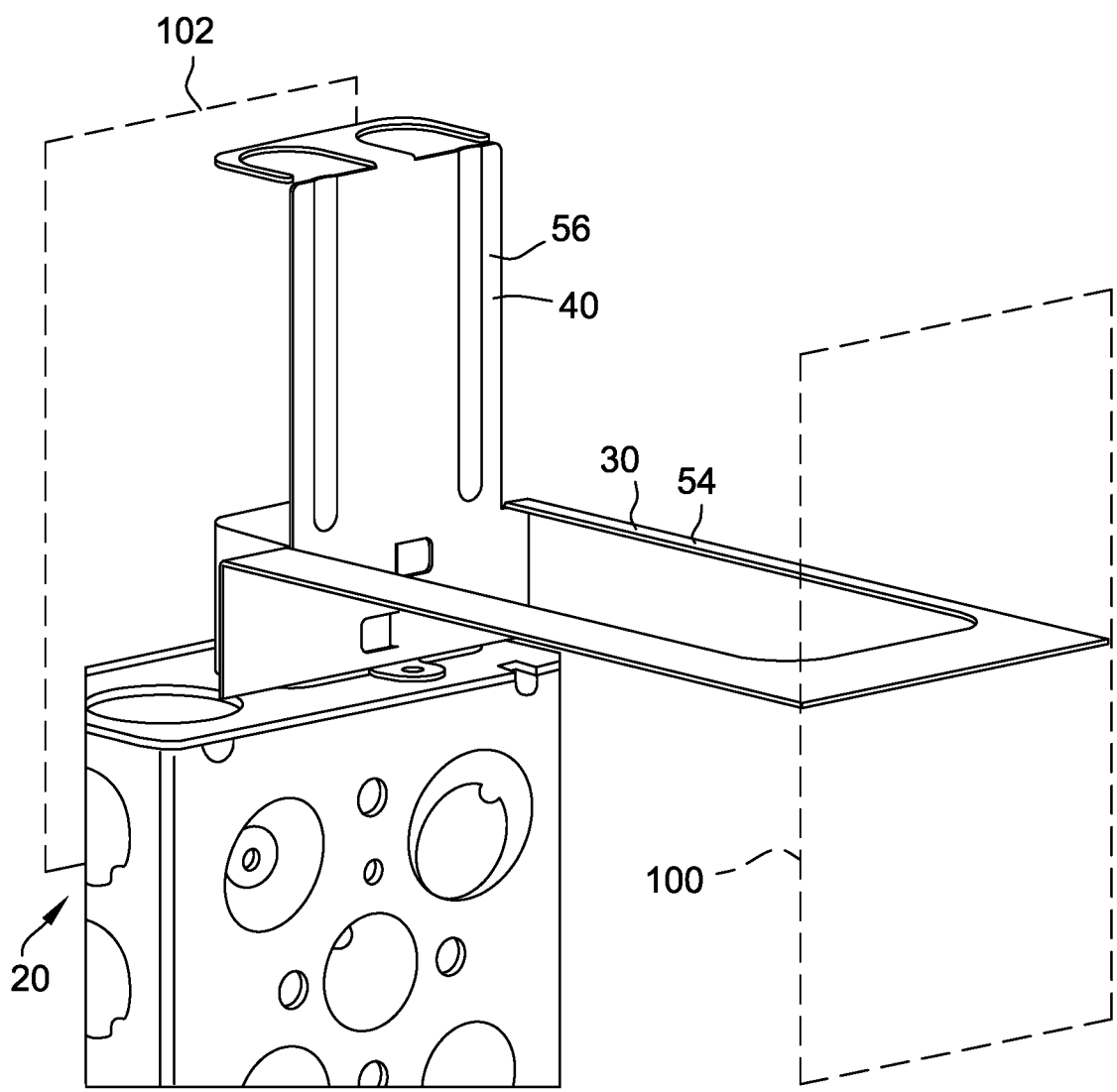
FIG. 1B is a partial rear perspective view of the electrical box assembly shown in FIG. 1A when the support member of the support bracket is bent along the bending line to engage a second wall.

In the exemplary embodiment, the plate member 52 includes a maximum bending axis or a bending line 60. The bending line 60 divides the plate member 52 into a first portion 54 and a second portion 56. The plate member 52 has first and second configurations. The plate member 52 is generally planar in the first configuration (FIG. 1A). When the plate member 52 is in the second configuration, the first portion 54 bends along the bending line 60 and extends laterally from the second portion 56 to engage the second wall 100 (FIG. 1B).

In the exemplary embodiment, the support member 30 bends approximately 90° from its initial position in the plane of the main member 40 (FIG. 3) in the direction toward second wall 100. The distal end (i.e. the top end extending over the main member 40 in the embodiments illustrated) of the support member 30 may be bent 90° to extend perpendicular to the remainder of the support member 30 to provide an engagement surface to abut against an interior surface of the second wall 100. Further gradations of bending are possible such that the length of the support member 30 that extends toward the second wall 100 can be reduced to accommodate a different spacing distance 31 (FIG. 2) between the electrical box 20 and the second wall 100 in different installations, although such additional gradations would require modifications of the support ribs or reinforcement ribs 50 to allow bending. Otherwise, sets of support brackets 12 could be provided having different axial length in the support member 30 that may be bent to realize different spacing distance 31 between the electrical box 20 and the second wall 100.

The support member 30 may include a slot 120 (FIG. 3) that is used with a tool such as a screwdriver to bend the support bracket out of plane to a position substantially perpendicular to contact the second wall 100. As such, the support member 30, once bent, may be located in a spaced apart but substantially-parallel plane to the cable management member 41, with the support member 30 and the cable management member 41 extending in opposite directions from the plane of the main member 40.

In the exemplary embodiment, the plate member includes an upper section 58 and a lower section 62 opposing the upper section 58. The lower section 62 is proximate the top wall 25 of the electrical box 20. The support bracket 12 may further include a clip 90 for coupling the support bracket 12 to the electrical box 20.

Figure 2:
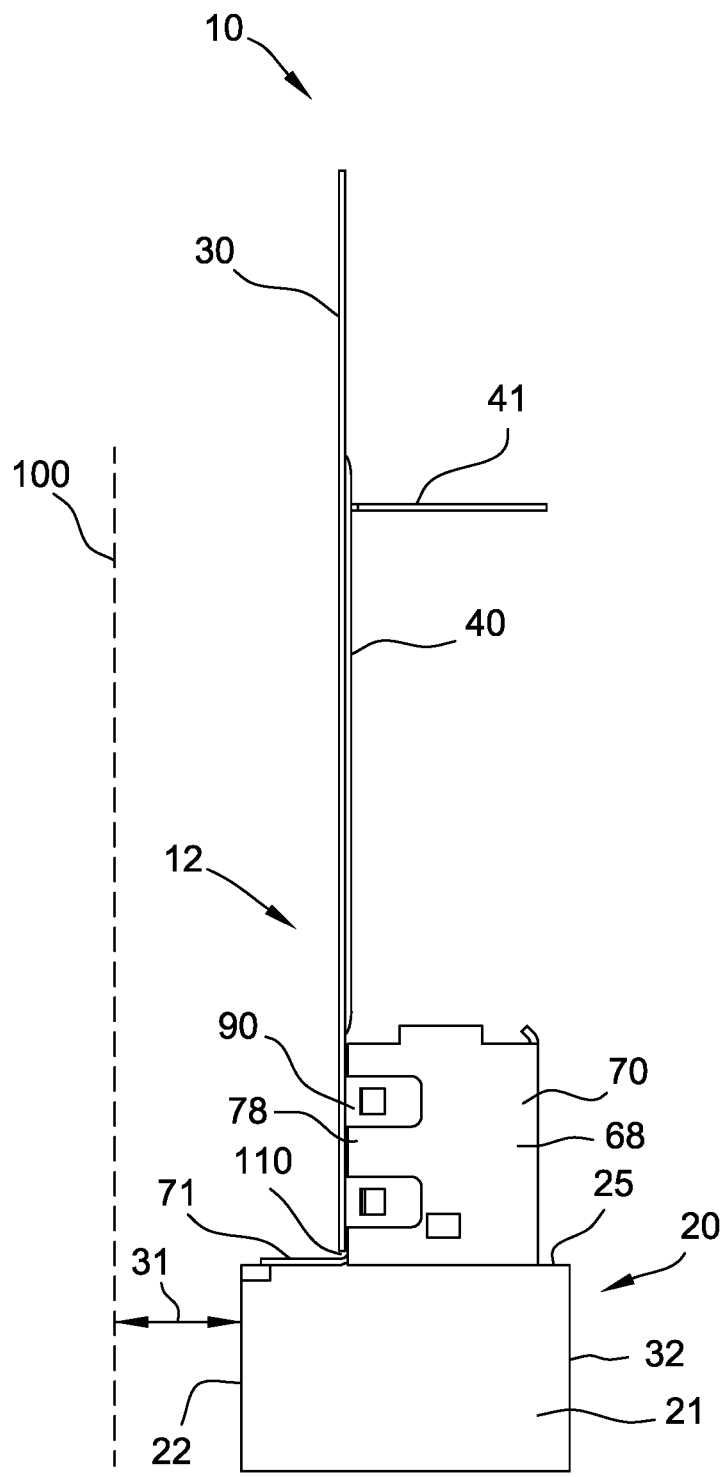
FIG. 2 is a partial side elevational view of the electrical box assembly shown in FIG. 1A.
Figure 3:
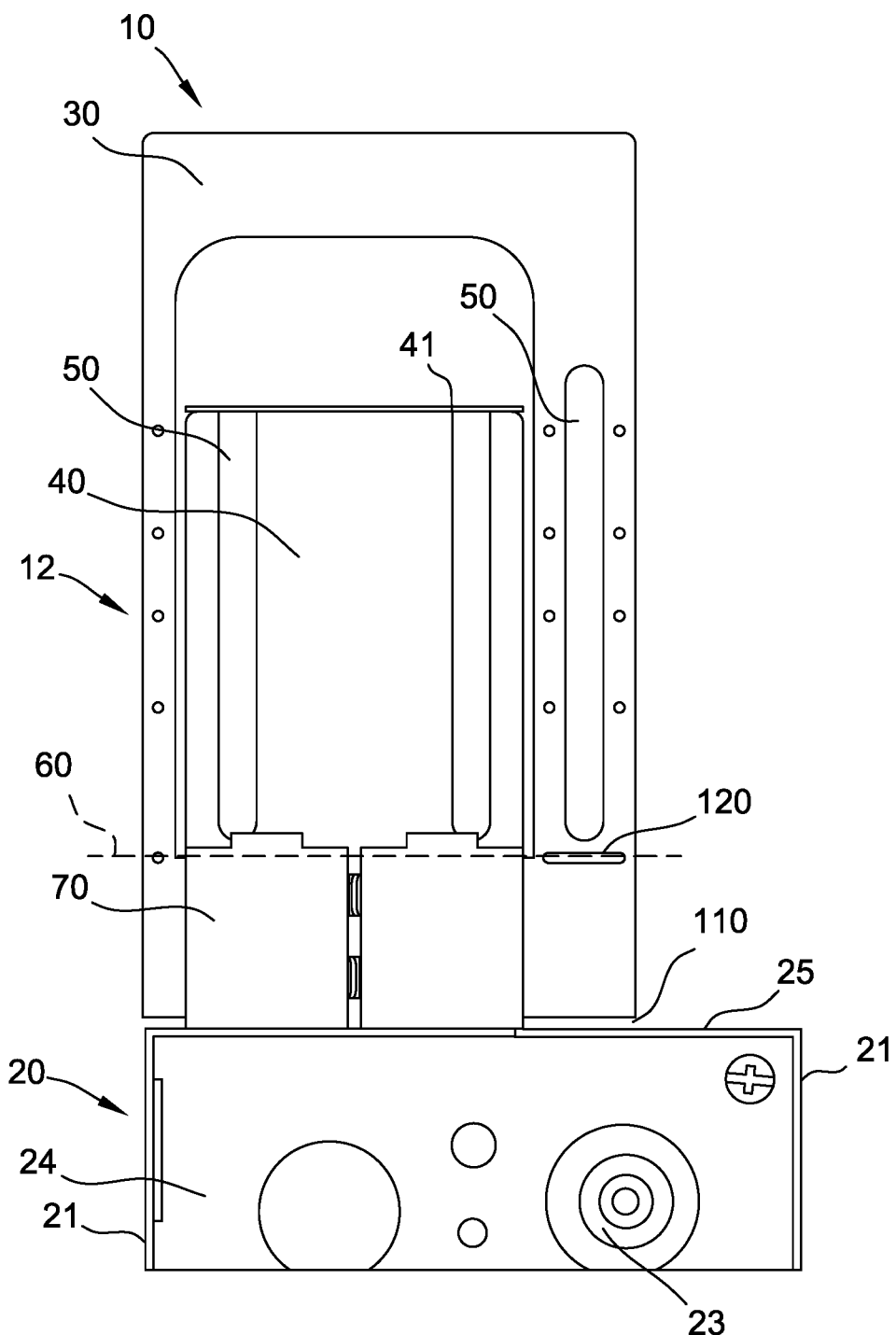
FIG. 3 is a partial front elevational view of the electrical box assembly shown in FIG. 1A.

In the exemplary embodiment, the electrical box assembly 10 further includes a connector mounting base 70. The connector mounting base 70 includes a front 68 and a back 78 opposing the front 68 (FIG. 2). The front 68 faces in the same direction as the front wall 32 of the electrical box 20. The connector mounting base 70 is attached to the top wall 25 of the electrical box 20 via a mounting tab 71. The mounting tab 71 may include a fastener opening 74 that receives a fastener (not shown) that engages the top wall 25. The fastener may be a screw that engages the top wall 25 with threaded attachment.

Figure 4:
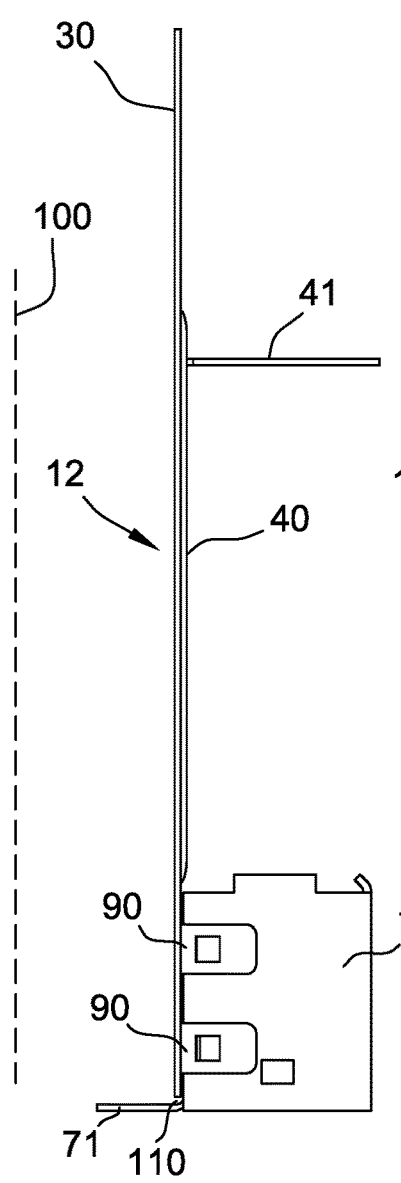
FIG. 4 is a side elevational view of a portion of the electrical box assembly shown in FIG. 1A.
Figure 5:
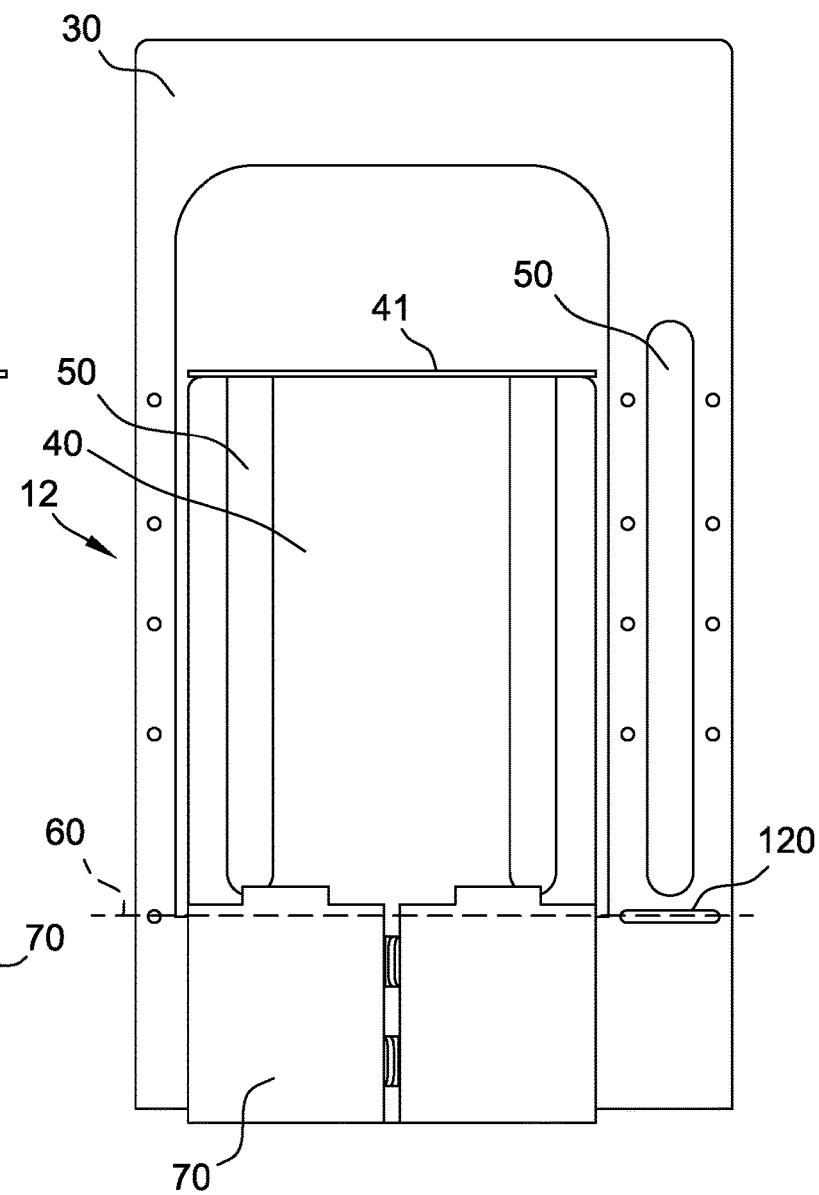
FIG. 5 is a front view of the portion of the electrical box assembly shown in FIG. 4.
Figure 6:
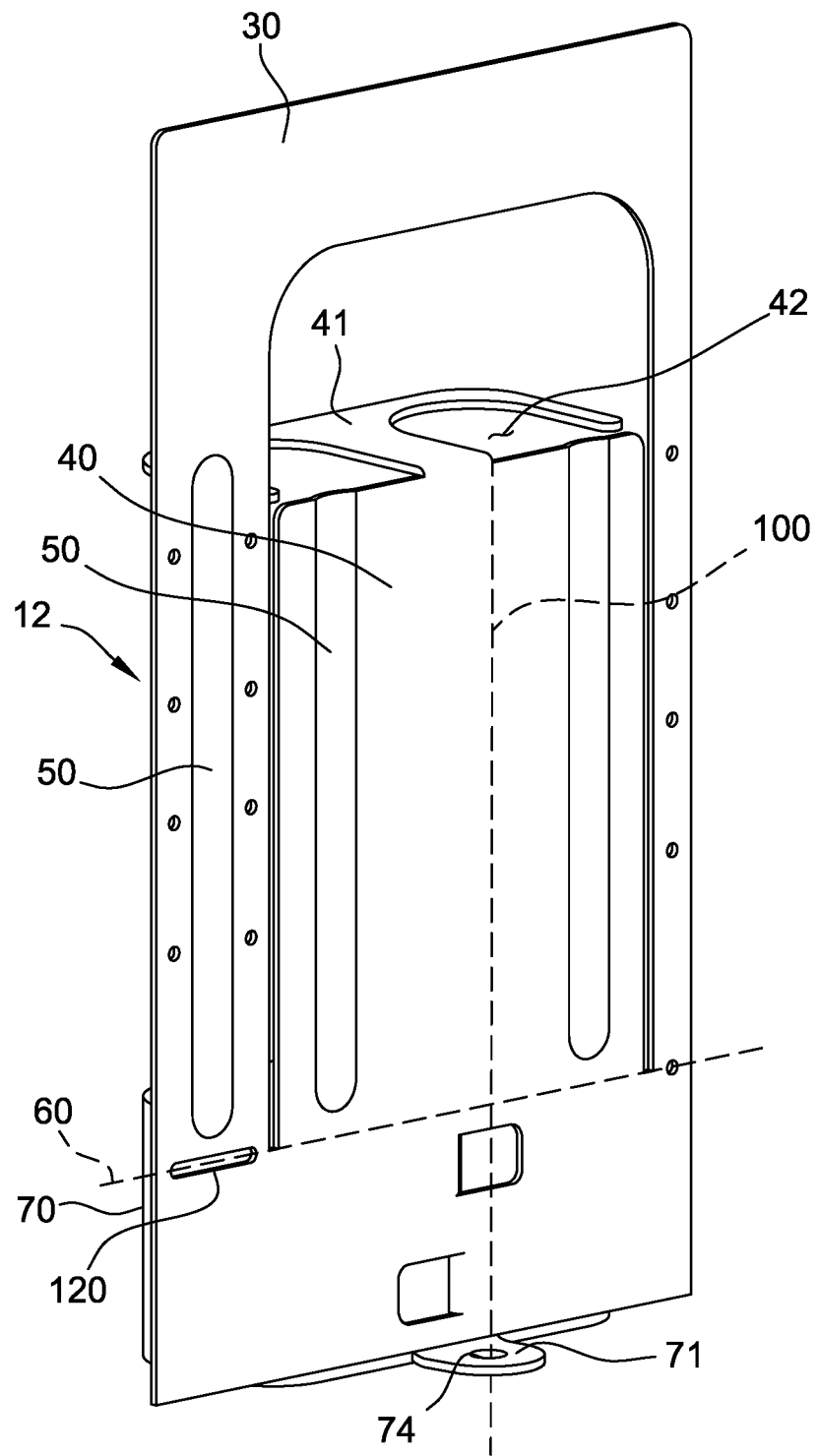
FIG. 6 is a rear perspective view of the portion of the electrical box assembly shown in FIG. 4.
Figure 7:
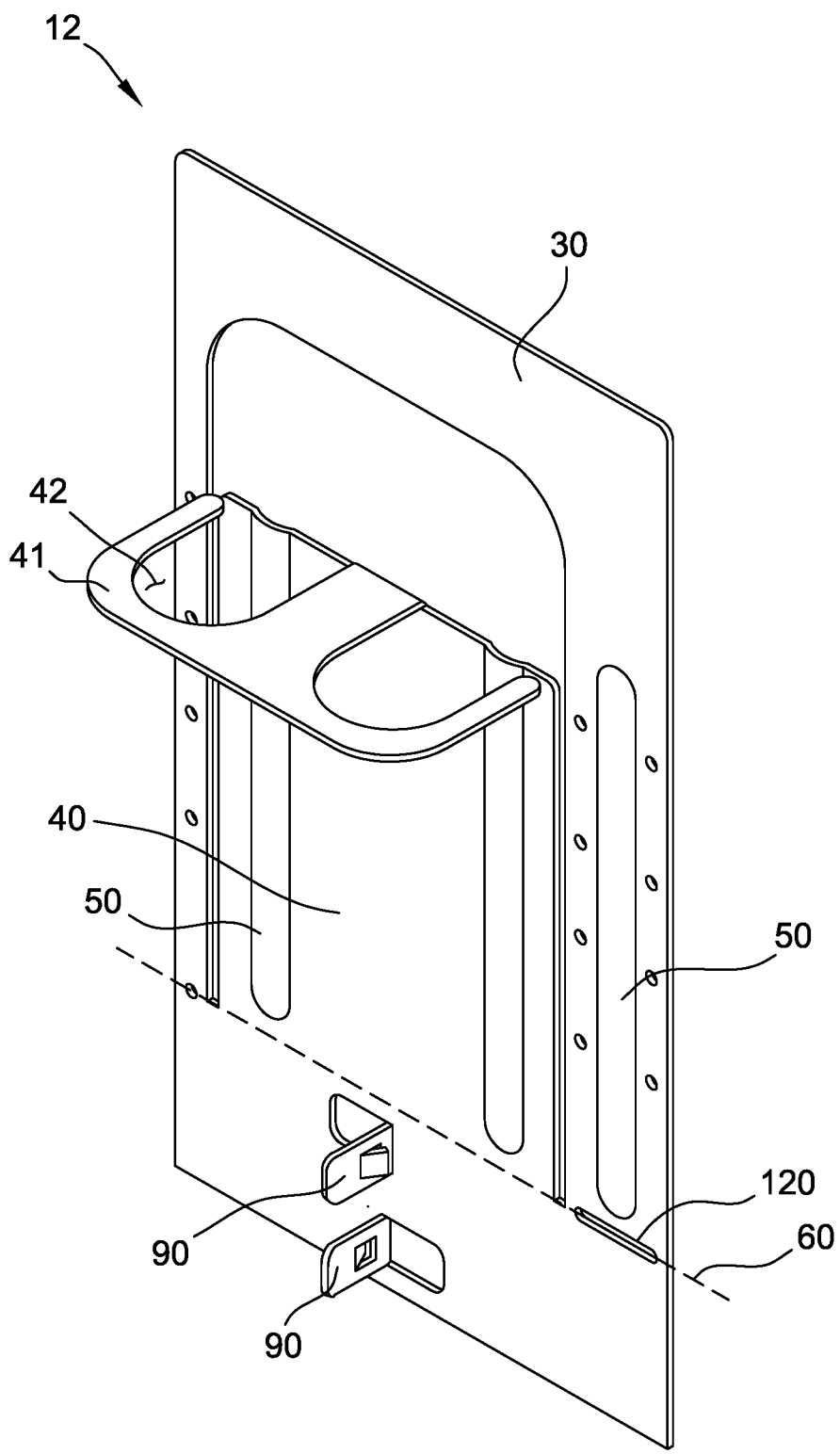
FIG. 7 is a front perspective view of the support bracket shown in FIGS. 1A-6.
Figure 8:
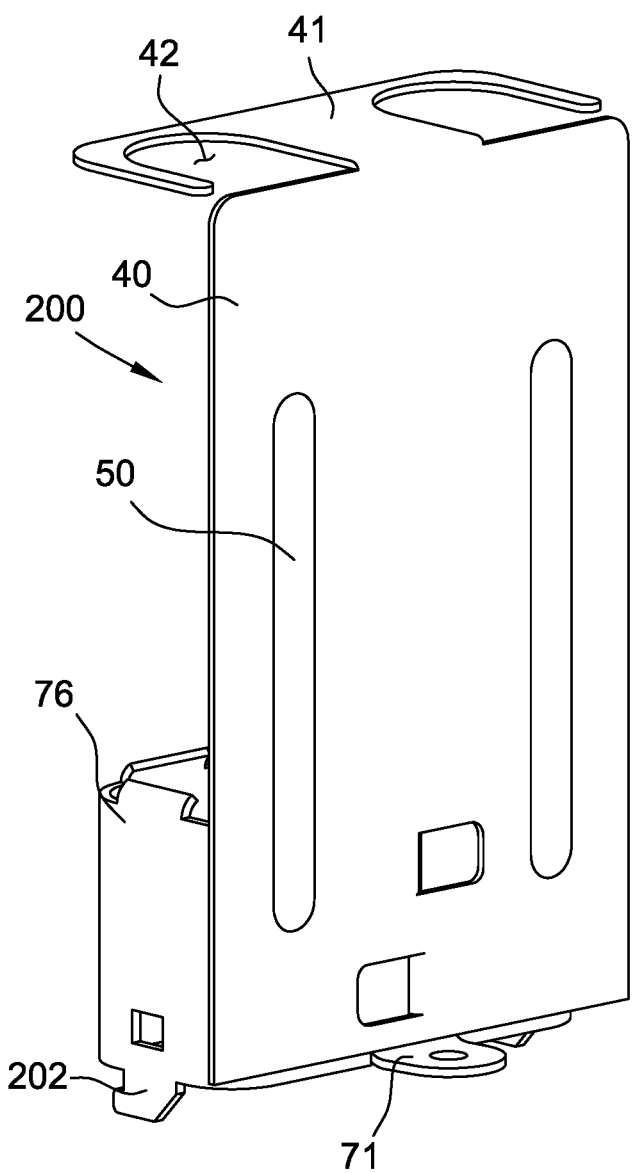
FIG. 8 is a perspective view of a portion of another exemplary support bracket coupled with a connector mounting base.
Figure 9:
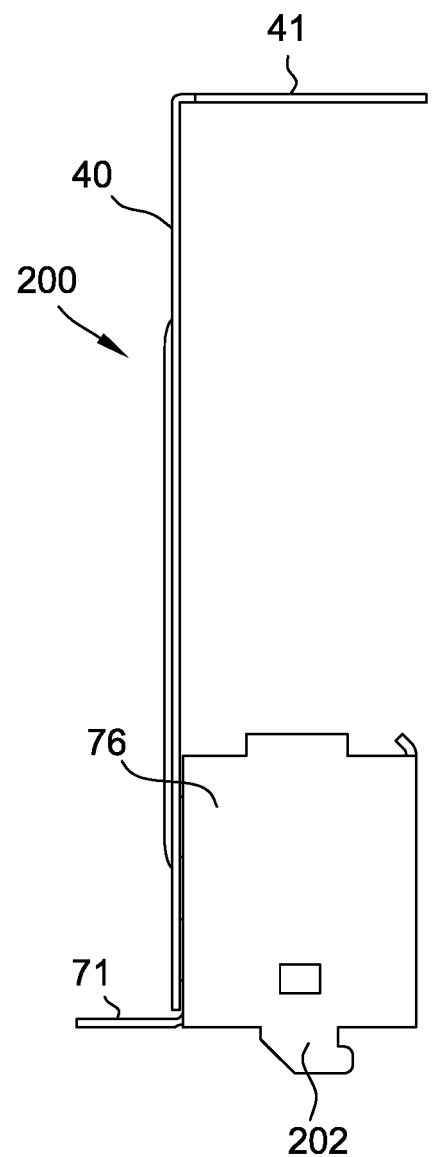
FIG. 9 is a side view of the support bracket and connector mounting base shown in FIG. 8.
Figure 10:
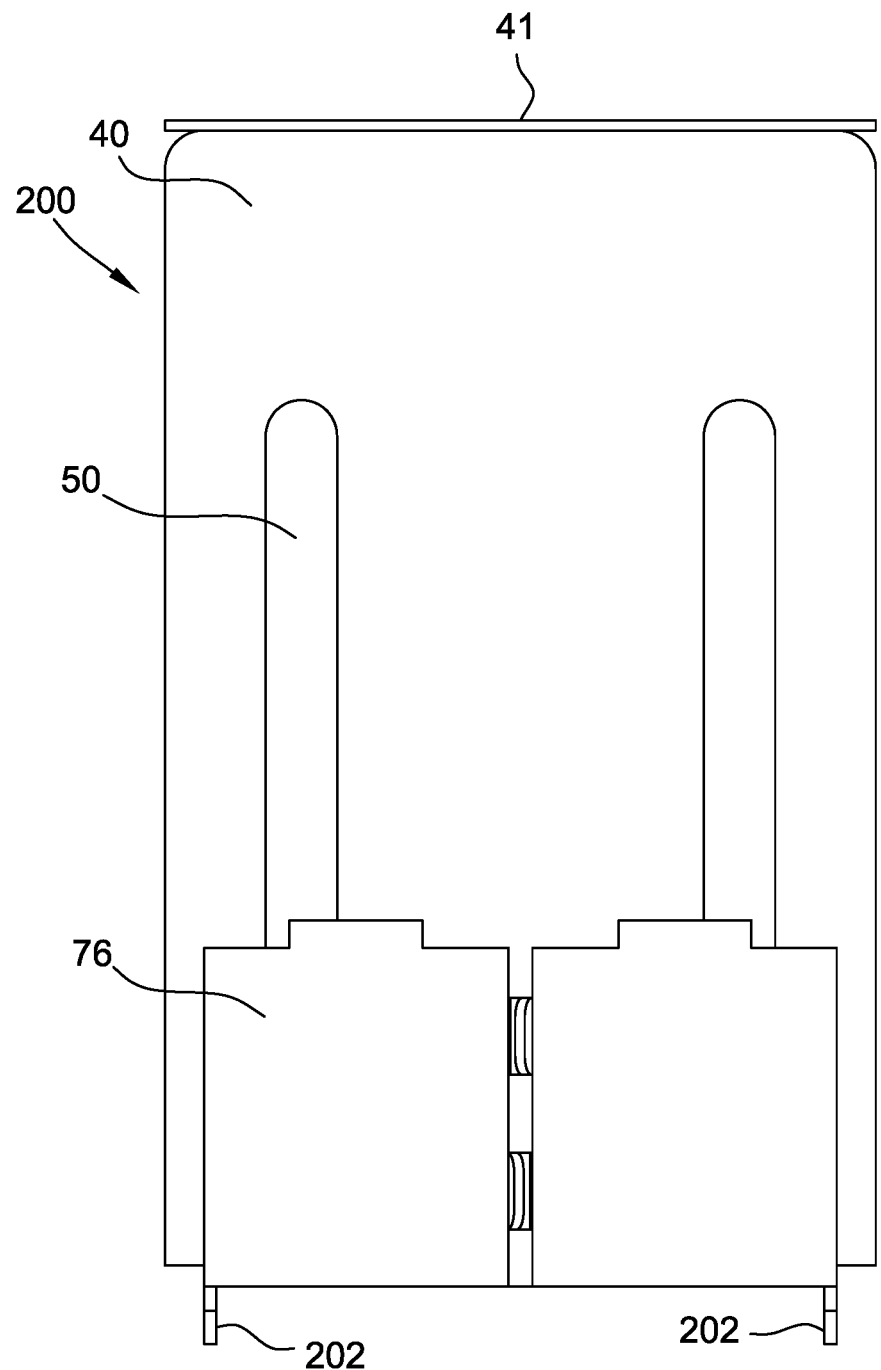
FIG. 10 is a front view of the support bracket and the connector mounting base shown in FIG. 8.
Figure 11:
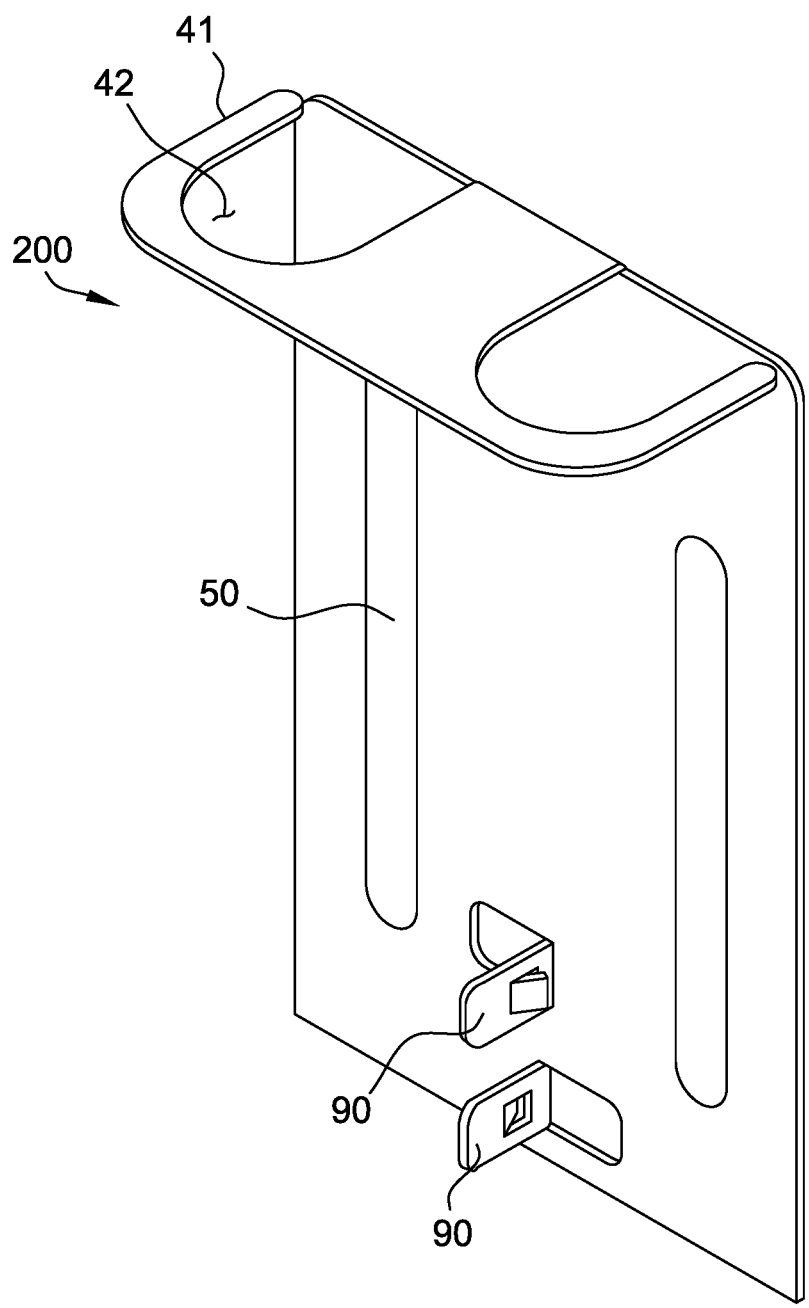
FIG. 11 is a front perspective view of the support bracket shown in FIGS. 8-10.
Figure 12:
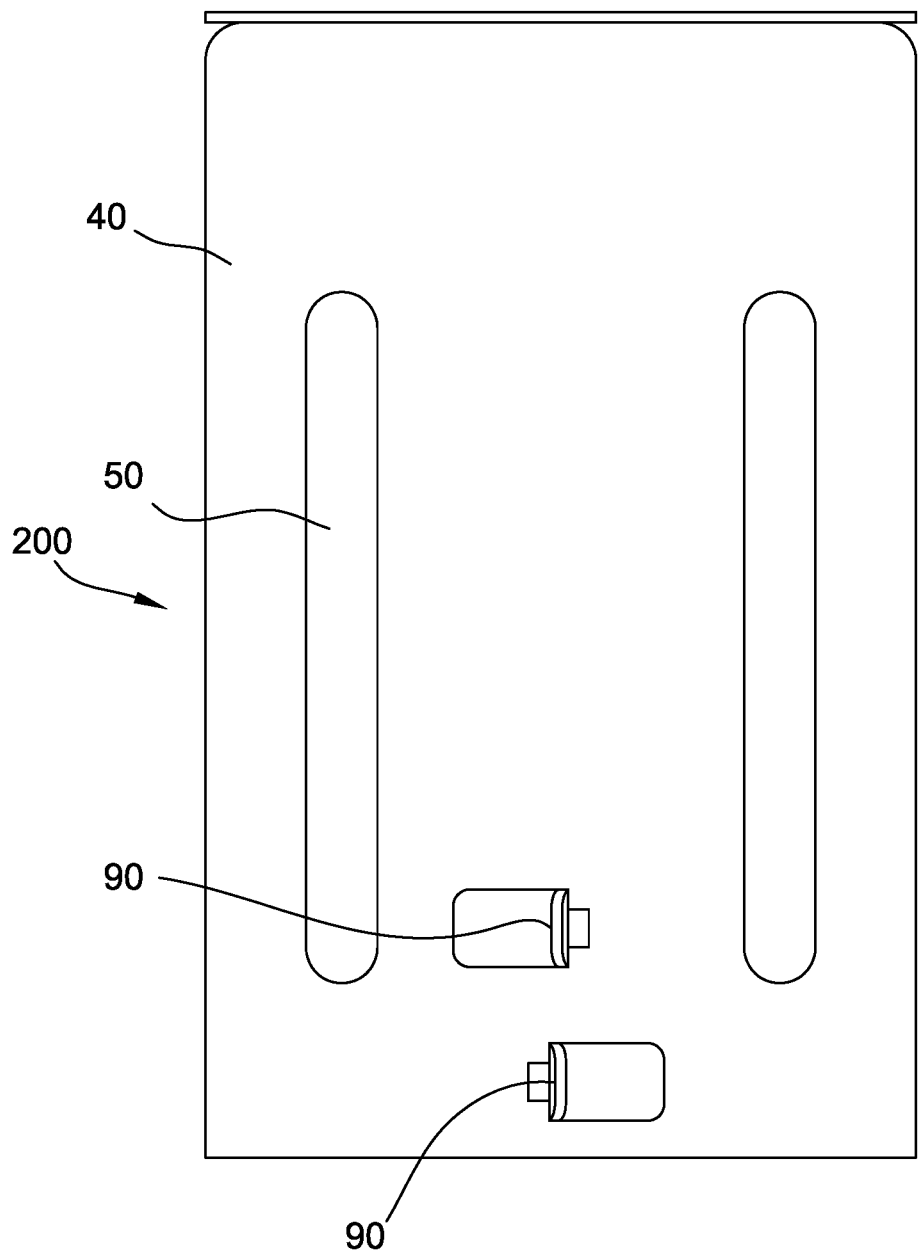
FIG. 12 is a rear view of the support bracket shown in FIG. 11.
Figure 13:
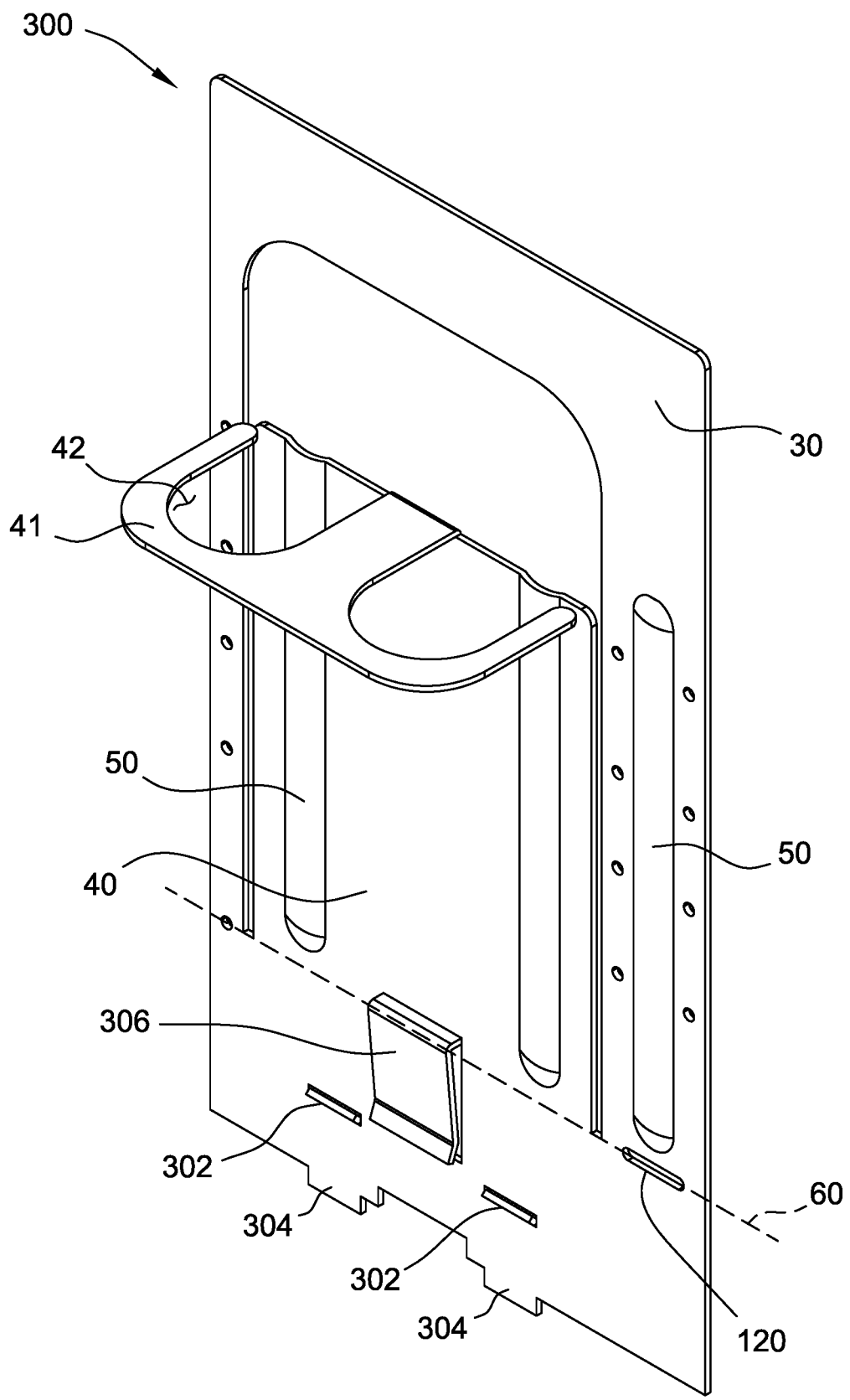
FIG. 13 is a perspective view of another exemplary support bracket.
Figure 14:
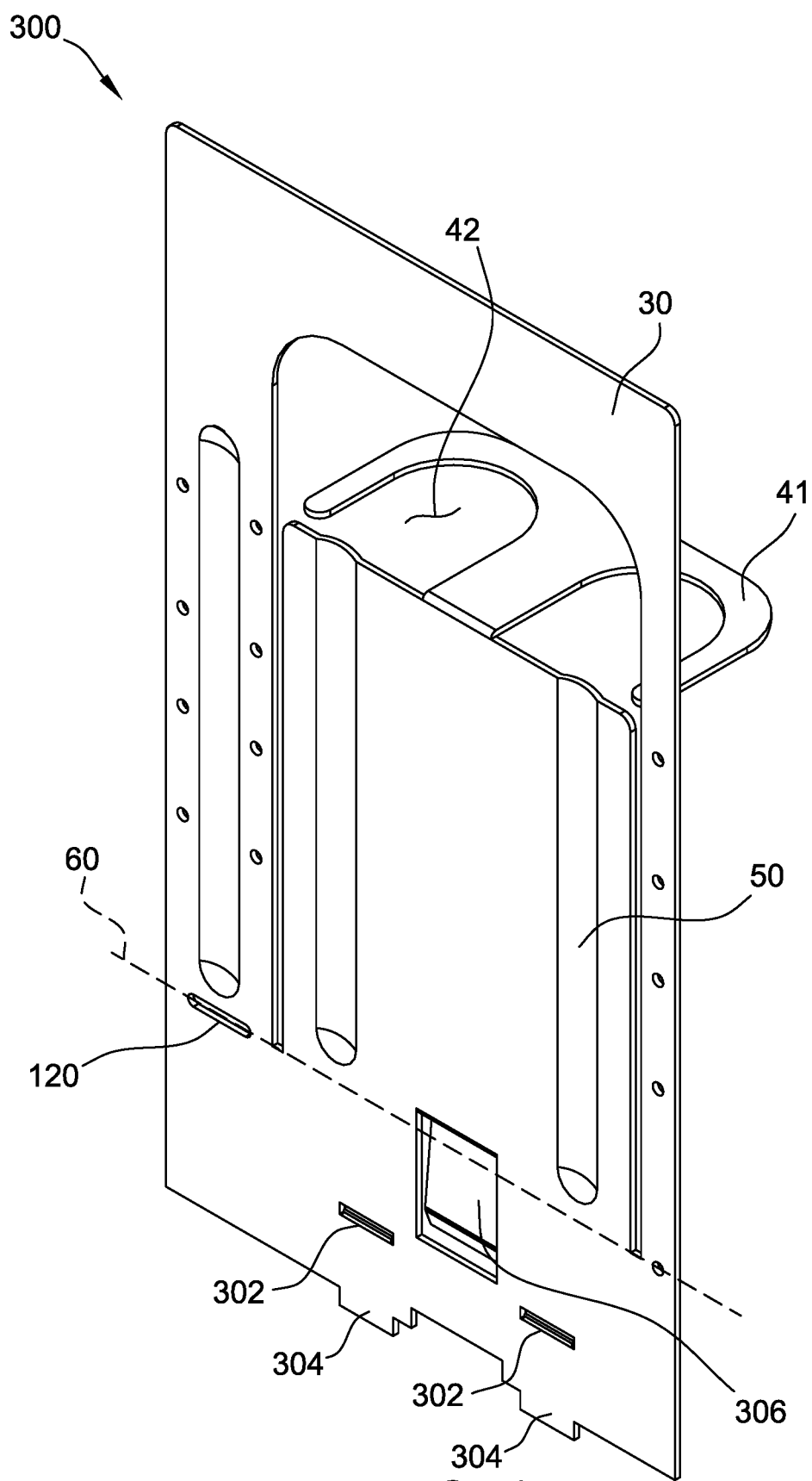
FIG. 14 is a rear perspective view of the bracket shown in FIG. 13.

In the exemplary embodiment, the support bracket 12 is coupled to the electrical box 20 via the connector mounting base 70. That is, the support bracket 12 is indirectly attached to the electrical box 20. The connector mounting base 70 is attached to the top wall 25 of the electrical box 20 and may be offset from the center thereof. The support bracket 12 is slidably attached in an interlocking manner to the connector mounting base 70 via integrally formed clips 90 that are cut and bent out of plane from the lower section 62 of the support bracket 12 (FIGS. 4 and 7).

As shown in the illustrated embodiments, support bracket 12 and connector mounting base 70 are offset with respect to a centerline of the electrical box 20. In some embodiments, there is also a small gap 110 between the top wall 25 of the electrical box 20 and the lower edge of the support bracket 12. The support bracket 12 and the electrical box 20 are not directly connected in surface engagement with one another, nor does any fastener (e.g., a screw) directly attach the support bracket 12 to the electrical box 20.

The placement of the support bracket 12 on the top wall 25 of the electrical box 20 allows simpler installation than known support brackets, and the clip-on attachment of the support bracket 12 to the connector mounting base 70 further simplifies the assembly by eliminating separate fasteners that would otherwise be required. The support bracket 12 can be slidably attached to the connector mounting base 70, and easily removed if needed with a simple insertion of a tool to unlock the clips 90. The support bracket 12 may be easily formed and shaped using known techniques such that it provides functions of containing cables and supporting the electrical box at relatively low cost and ease of use.

FIGS. 8-12 illustrate electrical box assemblies including a support brackets 200 that may be recognized as the support bracket 12 with the support member 30 omitted. In the exemplary embodiment, the support bracket 200 is attached to a connector mounting base 76. Compared to the connector mounting base 70, the connector mounting base 76 further includes locator tabs 202 that assist with engaging the connector mounting base 76 to the electrical box 20 in the desired orientation. The support bracket 200 in the assembly does not include the support member 30. The support bracket 200 indirectly attaches to the electrical box 20 via the clips 90 and therefore remains advantageous for assembly and installation purposes. The support bracket 200 is smaller than the support bracket 12 and therefore is provided at reduced cost via the reduced amount of material and simplified manufacture of the support bracket 200.

FIGS. 13-17 are various views of another exemplary support bracket 300. The support bracket 300 includes slots 302 which interface projections (not shown) on the connector mounting base 70 to engage the connector mounting base 70. The support bracket 300 may further include a plurality, such as a pair, of locator tabs 304 on the lower edge thereof.

Figure 18:
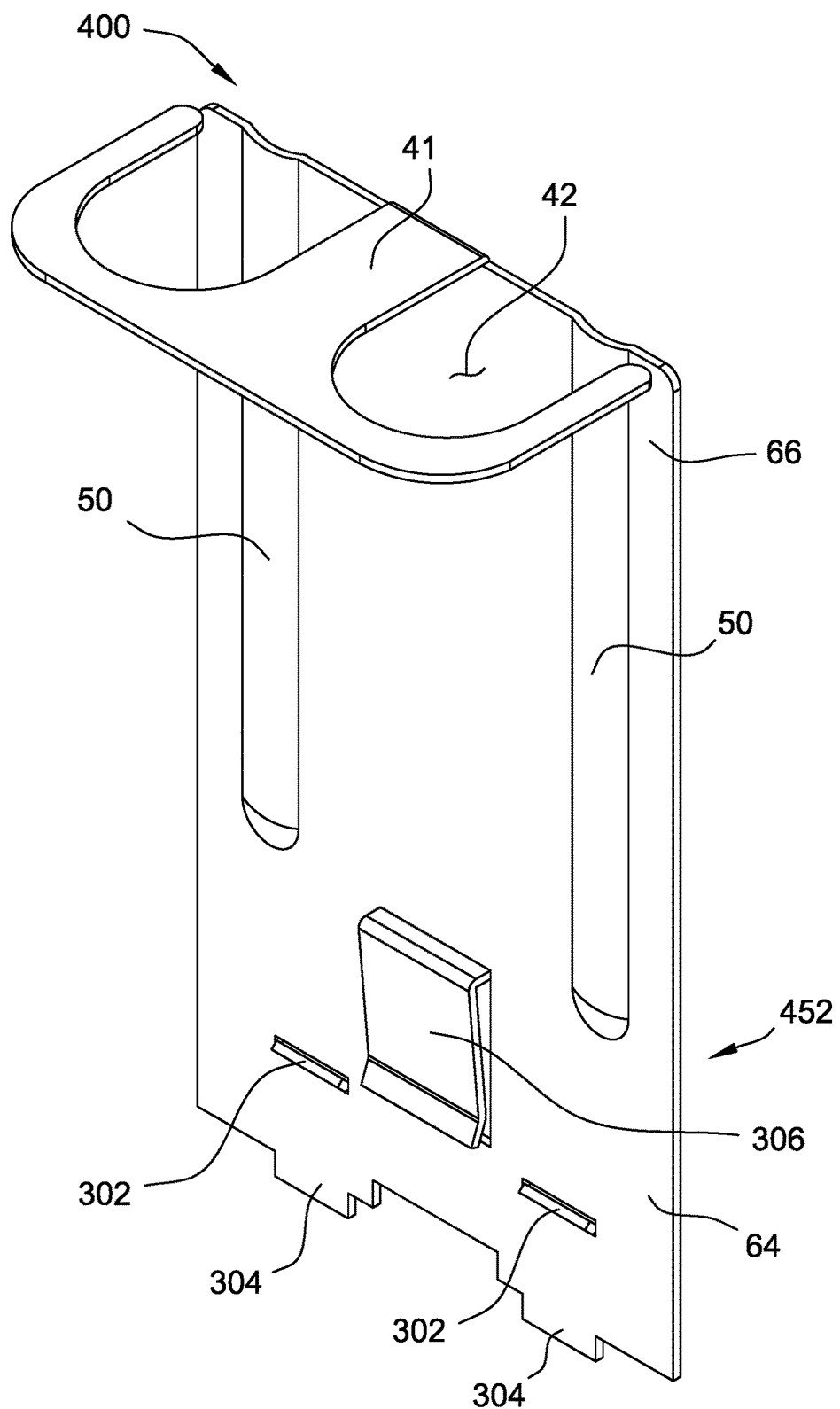
FIG. 18 a front perspective view of another exemplary support bracket.
Figure 19:
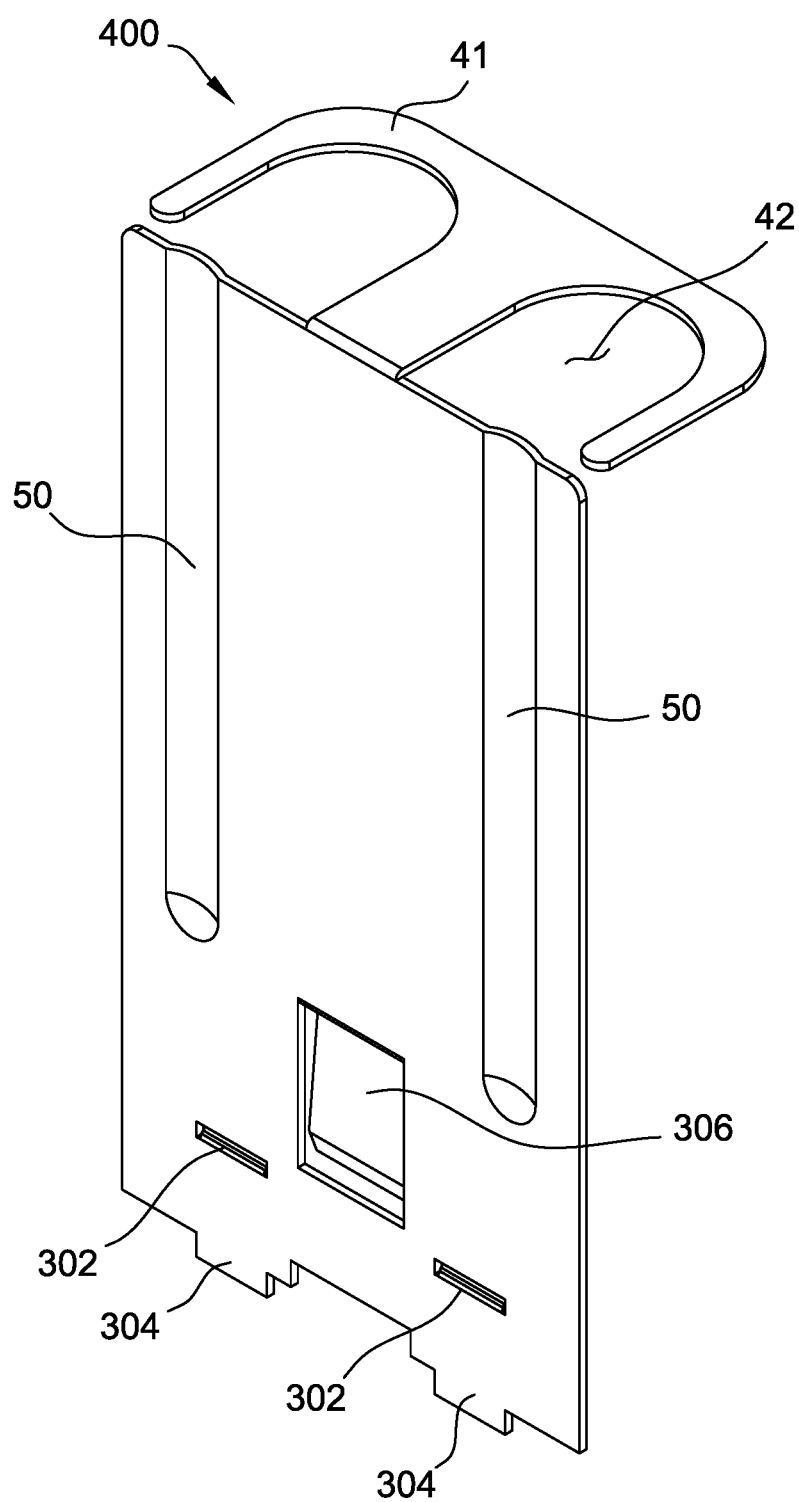
FIG. 19 is a rear perspective view of the support bracket shown in FIG. 18.
Figures 20, 21:
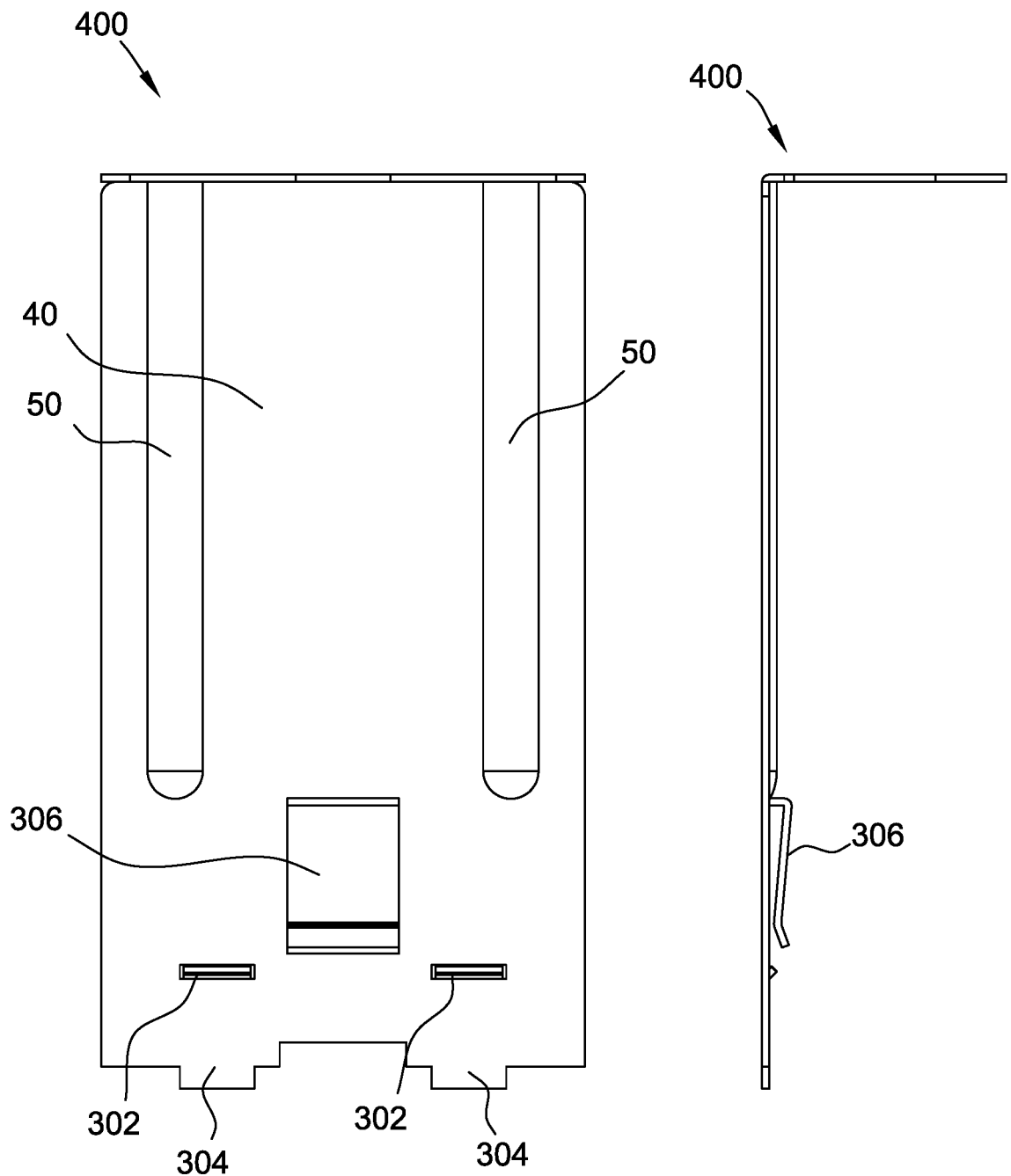
FIG. 20 is a front elevational view of the support bracket shown in FIG. 18.
FIG. 21 is a side view of the support bracket shown in FIG. 18.

The locator tabs 304 may extend from the proximate end 64 of the plate member 452 that is proximate the top wall 25 of the electrical box 20 and opposing the distal end 66 (FIG. 18) of the plate member 452 (FIG. 18). The locator tabs 304 may be received in slots in the top wall 25 of the electrical box 20. The support bracket 300 further includes a clip 306. The clip 306 couples the support bracket 300 to the connector mounting base 70. The clip 306 may be a low profile clip protruding slightly from and then at an angle toward the plane of the support bracket 300 at the proximate end 64 (FIG. 18) as best seen in FIG. 17 in a side view. The clip 306 includes a rounded distal end and is resiliently deflectable relative to the plane of the support bracket 300. The clip 306 may be slidably attached to a vertical side edge of the connector mounting base 70 and retained thereto.

The clip 306 is larger than the pair of clips 90 in the support bracket 12 described above and is comparatively easier to engage to or disengage from the connector mounting base 70 while being retained thereto. As shown in FIG. 17, a slight barb is formed in the surface of the support bracket 300 that provides for interlocking engagement with a recess in the connector mounting base 70. The interlocking engagement can be overcome to remove the support bracket 300 when desired.

Except for the changes described above, the benefits of the support bracket 300 are similar to the support bracket 12 as set forth above.

FIGS. 18-21 are various views of another support bracket 400. The support bracket 400 may be recognized as the support bracket 300 with the support member 30 omitted.

The support bracket 400 indirectly attaches to the electrical box 20 via the clip 306 and therefore remains advantageous for assembly and installation purposes, at reduced cost via the material reduction and simplified manufacture of the support bracket 400 relative to the support bracket 300.

The spacing distance 31 between the back wall 22 of the electrical box 20 and the second wall 100 may vary, depending on the size of the electrical box 20 and the distance of the second wall 100 set from the first wall 102. Support brackets disclosed here can accommodate such various spacing distances by providing a plurality of bending lines.

Figure 22:
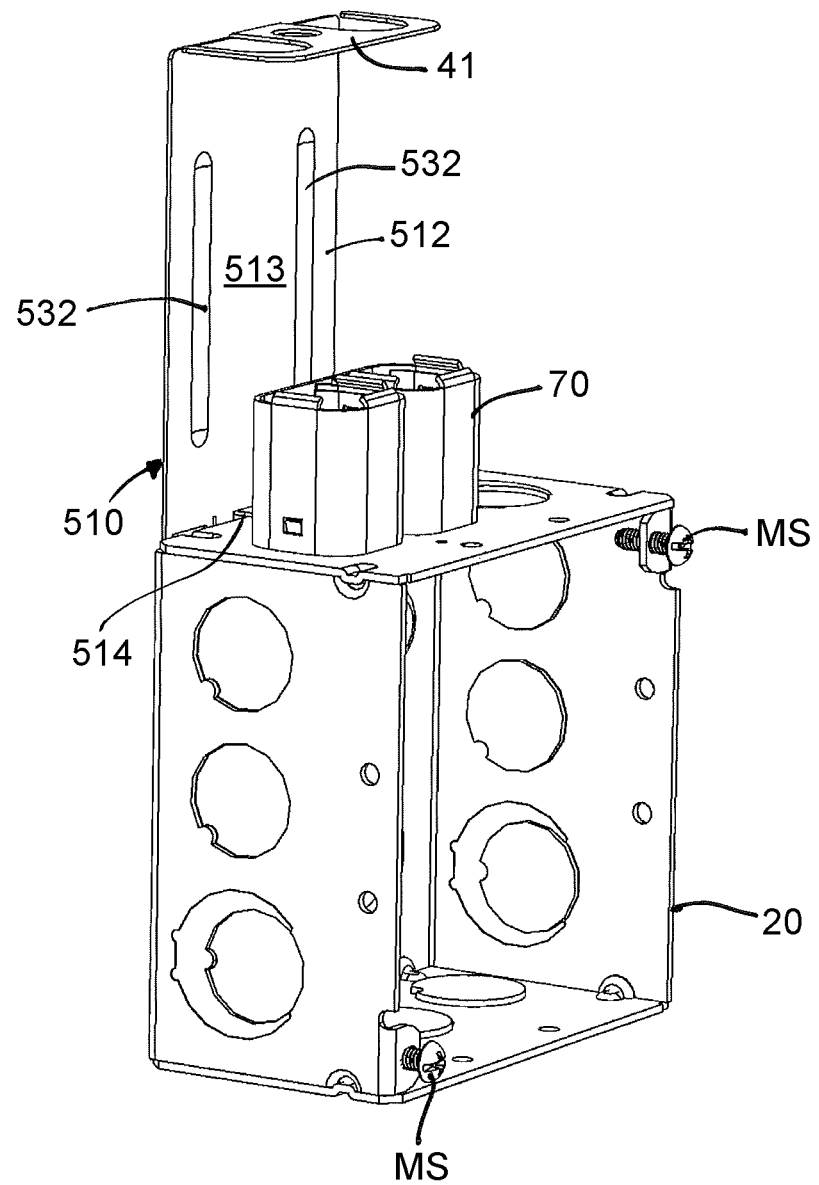
FIG. 22 is a front perspective of another exemplary support bracket attached to an electrical box.
Figure 23:
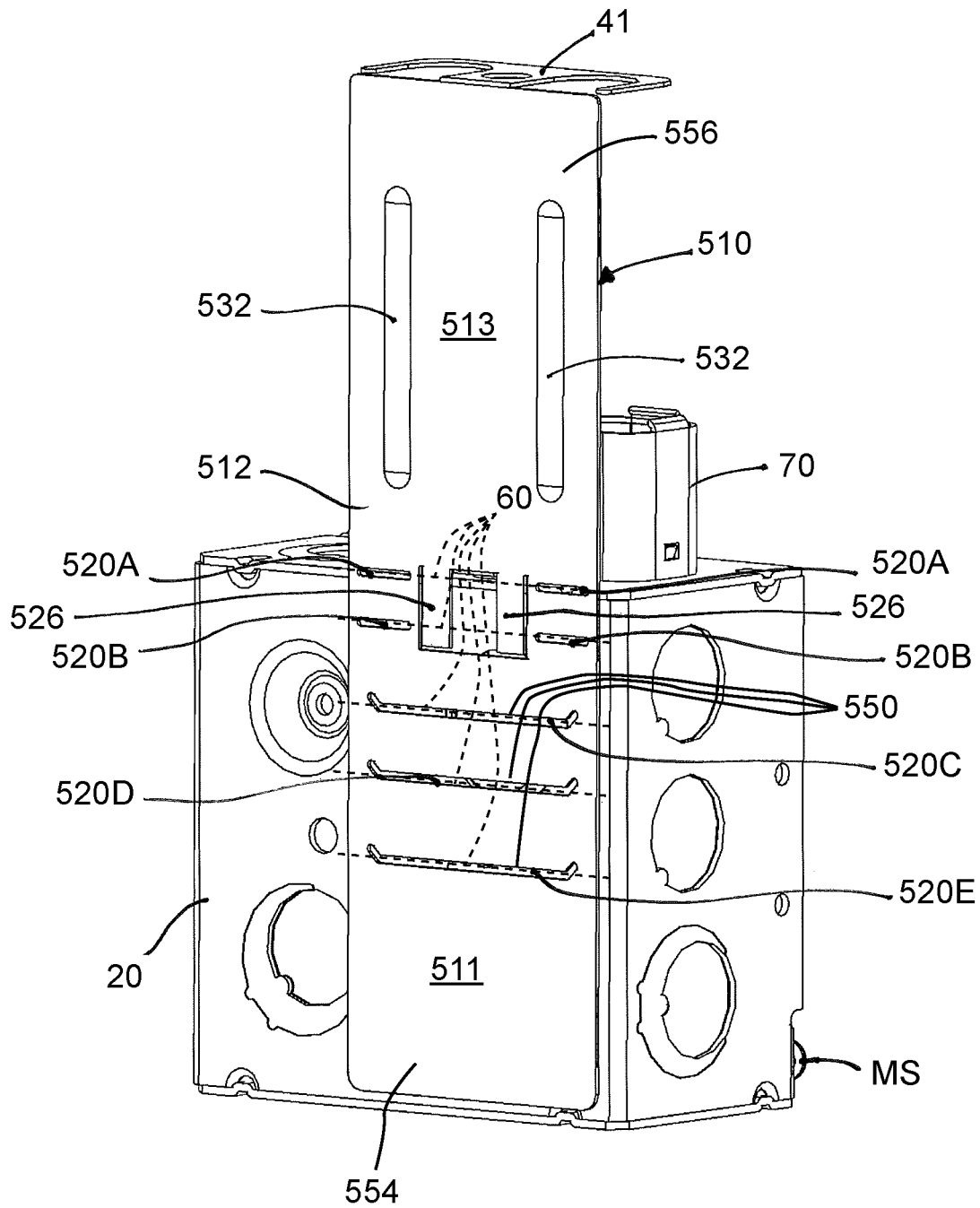
FIG. 23 is a rear perspective of the support bracket and electrical box shown in FIG. 22.
Figure 24:
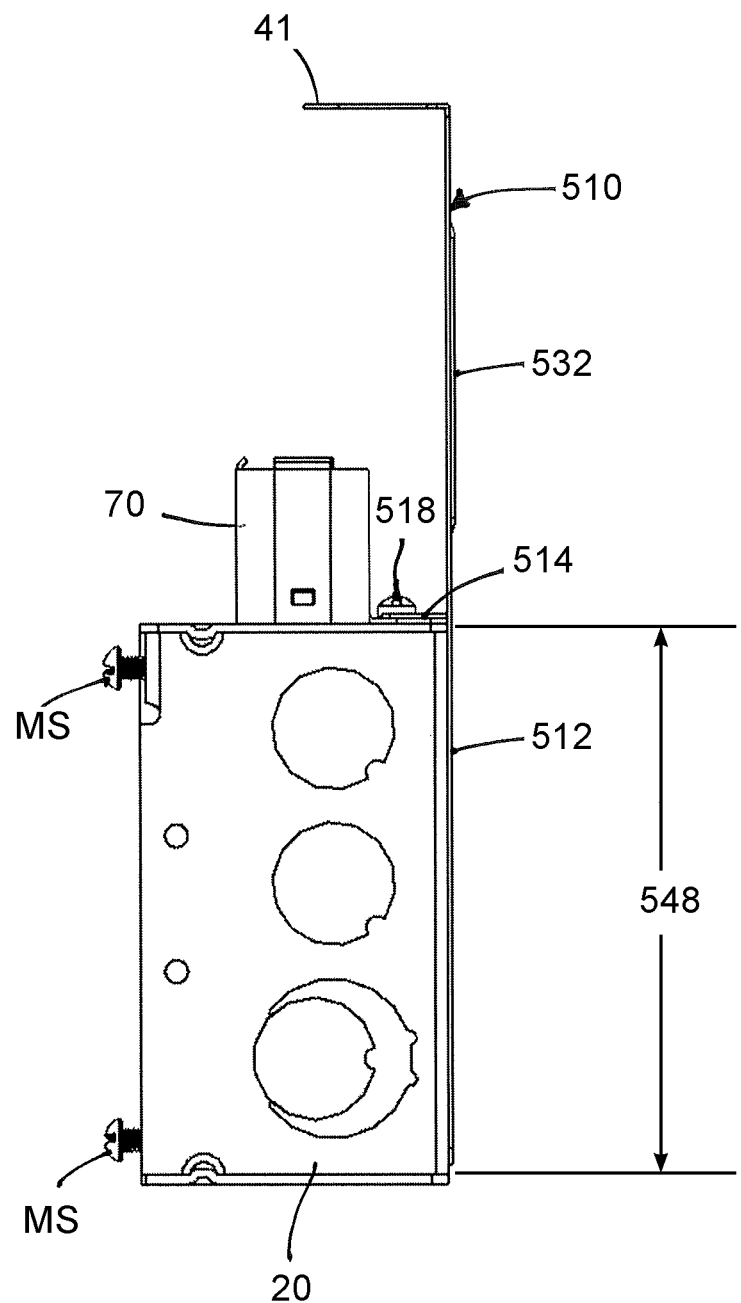
FIG. 24 is a side view of the support bracket and electrical box shown in FIG. 22.
Figure 25:
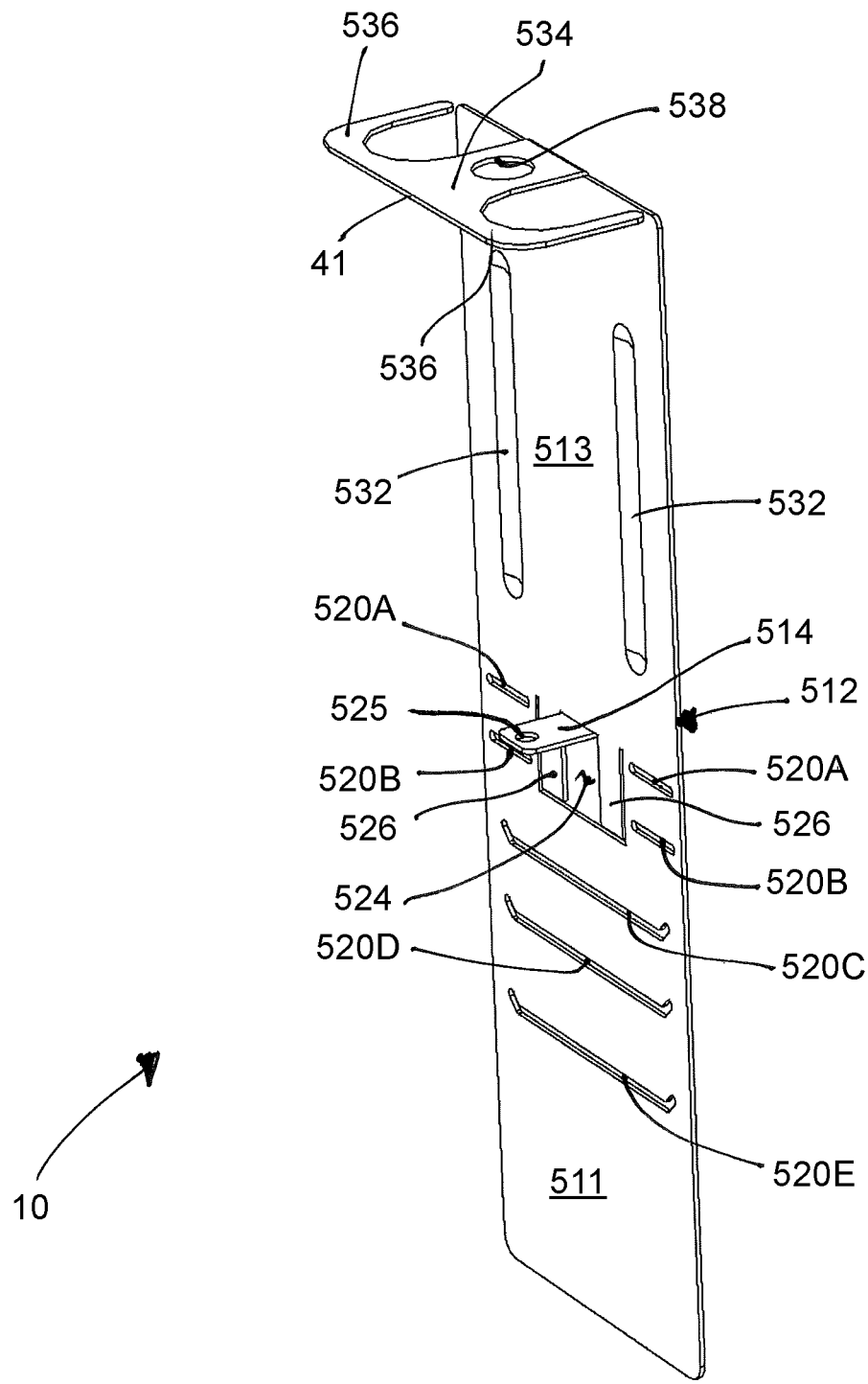
FIG. 25 is a perspective of the support bracket shown in FIGS. 22-24.
Figure 26:
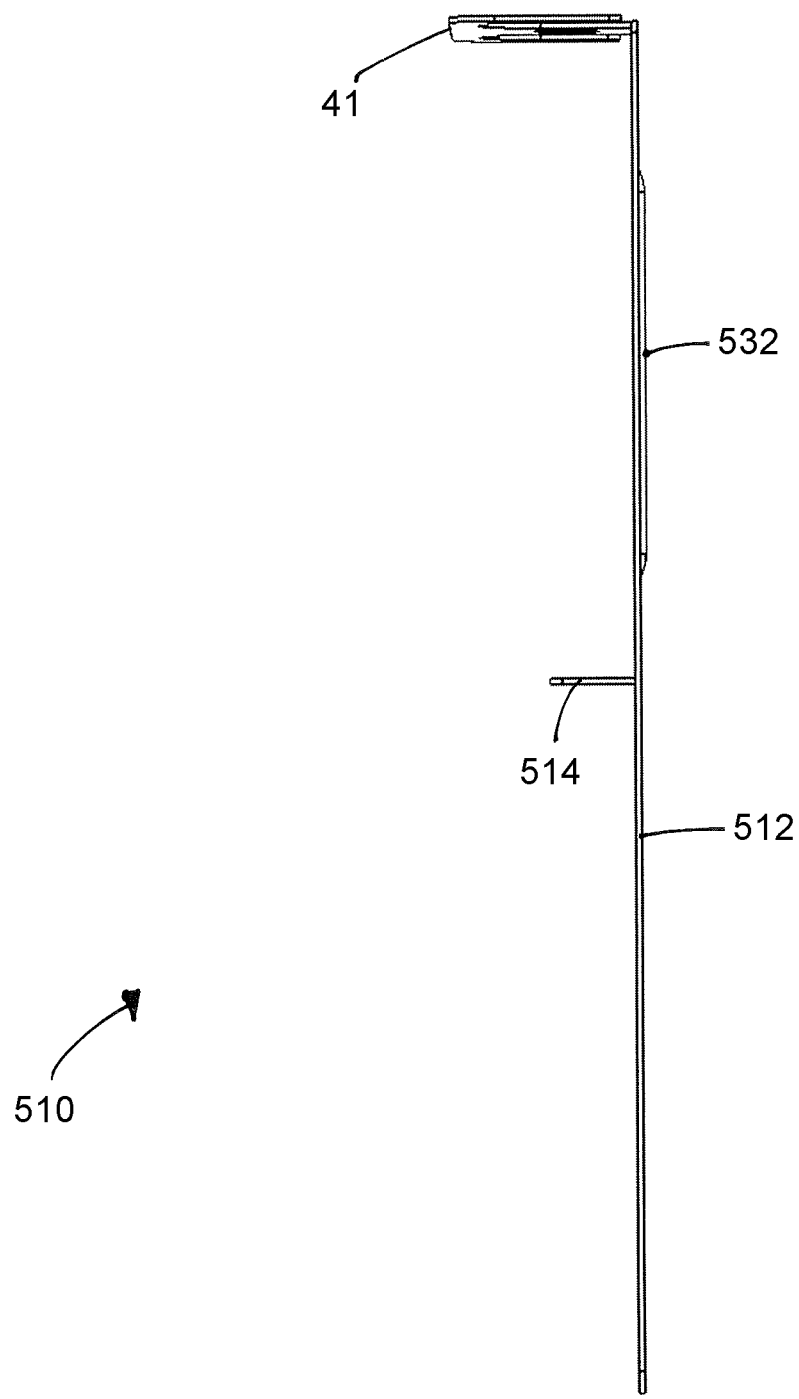
FIG. 26 is a side view of the support bracket shown in FIG. 25.
Figure 27:
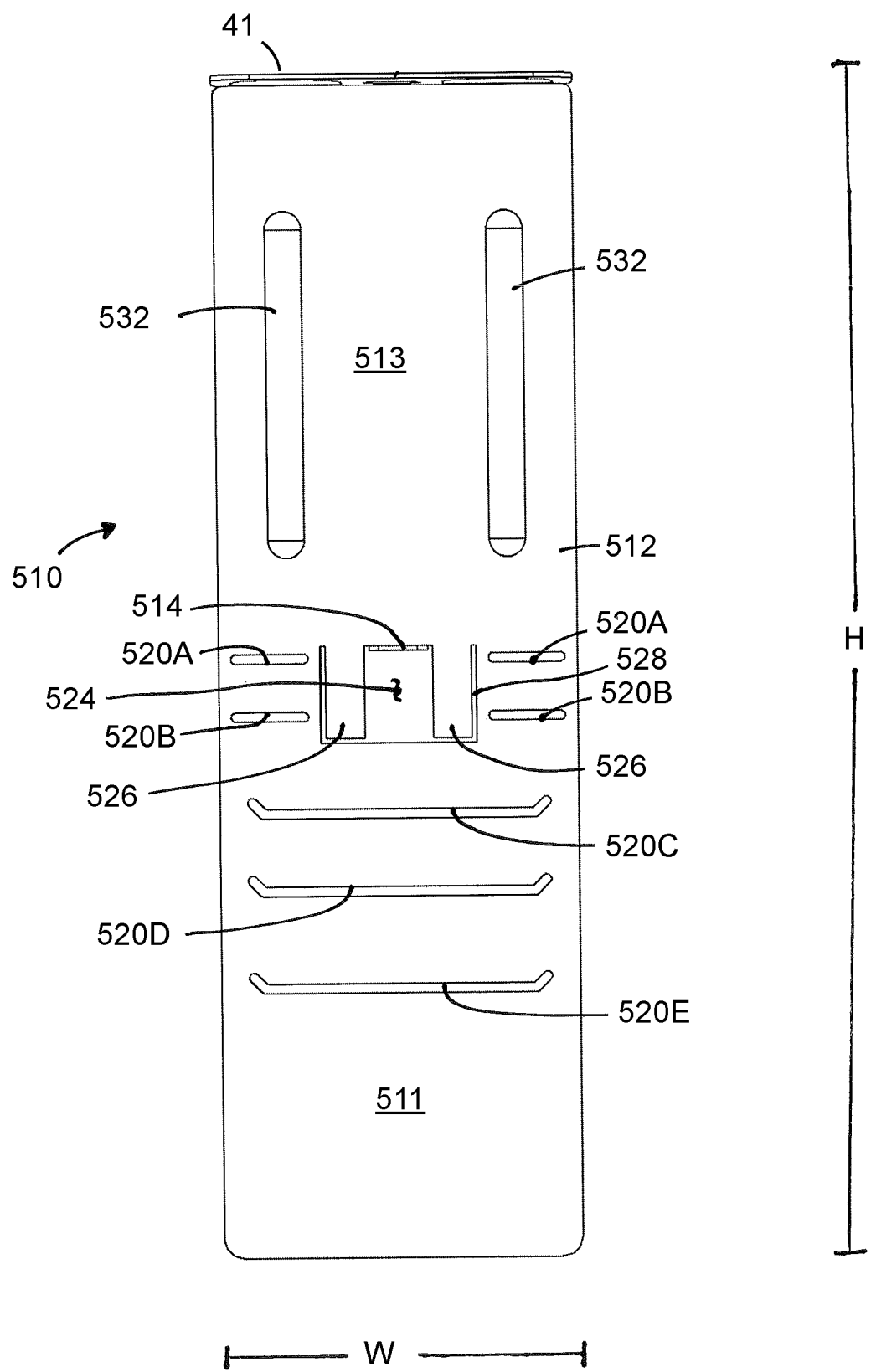
FIG. 27 is a front view of the support bracket shown in FIG. 25.
Figure 28:
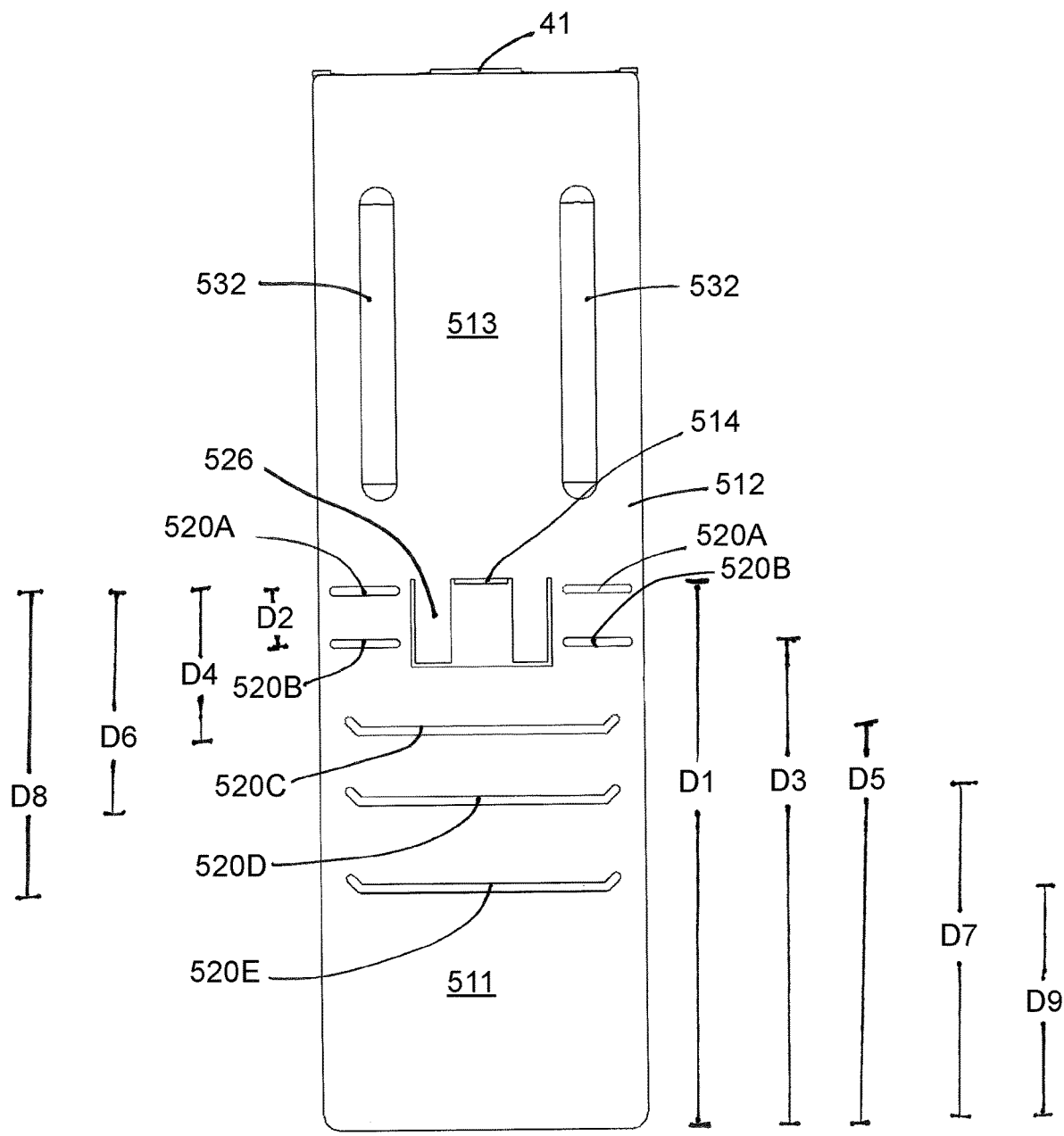
FIG. 28 is a rear view of the support bracket shown in FIG. 25.
Figure 29:
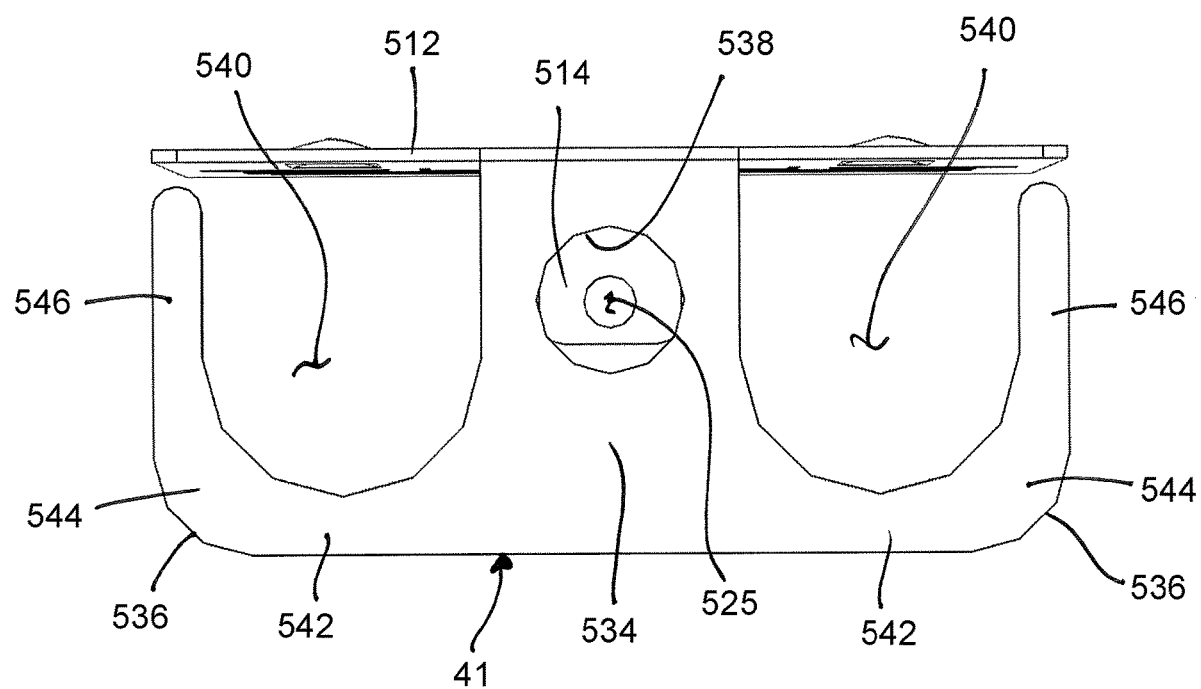
FIG. 29 is a top view of the support bracket shown in FIG. 25.
Figure 30:
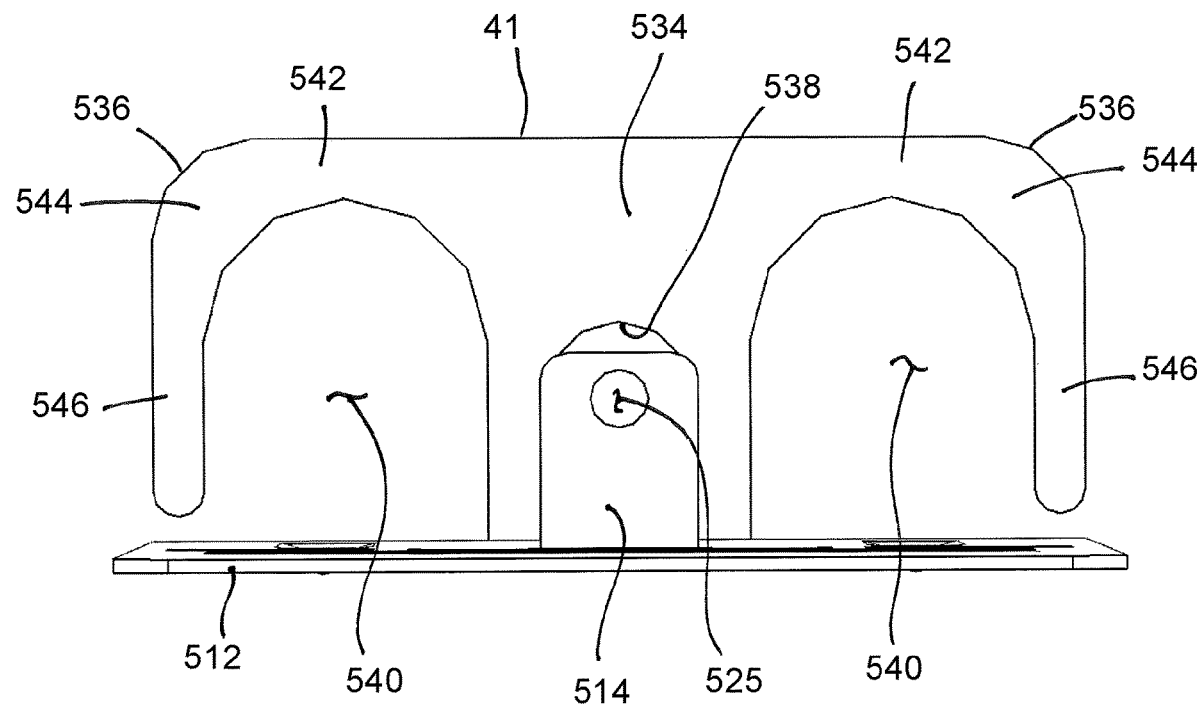
FIG. 30 is a bottom view of the support bracket shown in FIG. 25.
Figure 31:
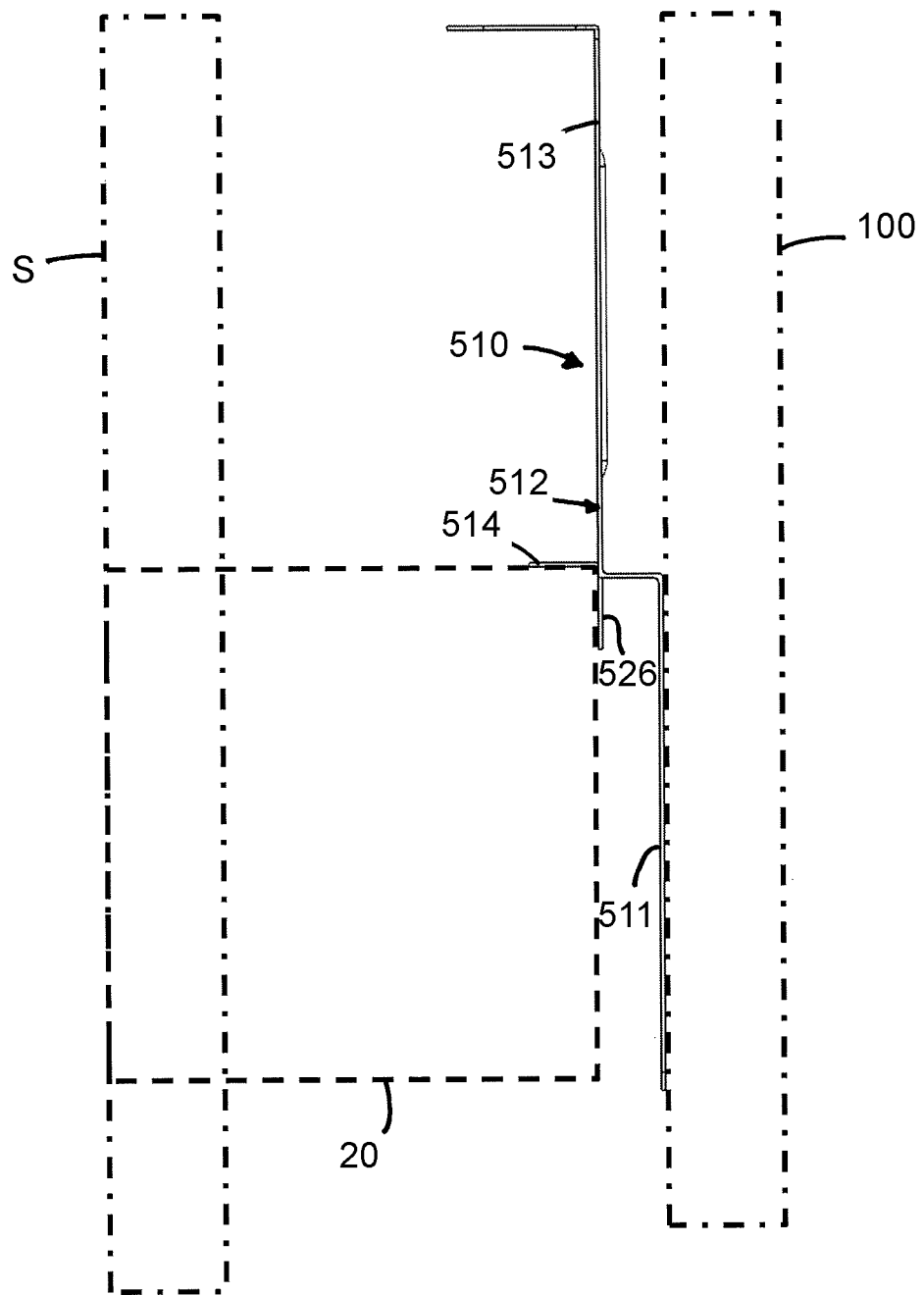
FIG. 31 is a side view of the support bracket shown in FIG. 25 in a first support configuration with schematic representation of an electrical box, a stud, and a second wall.
Figure 32:
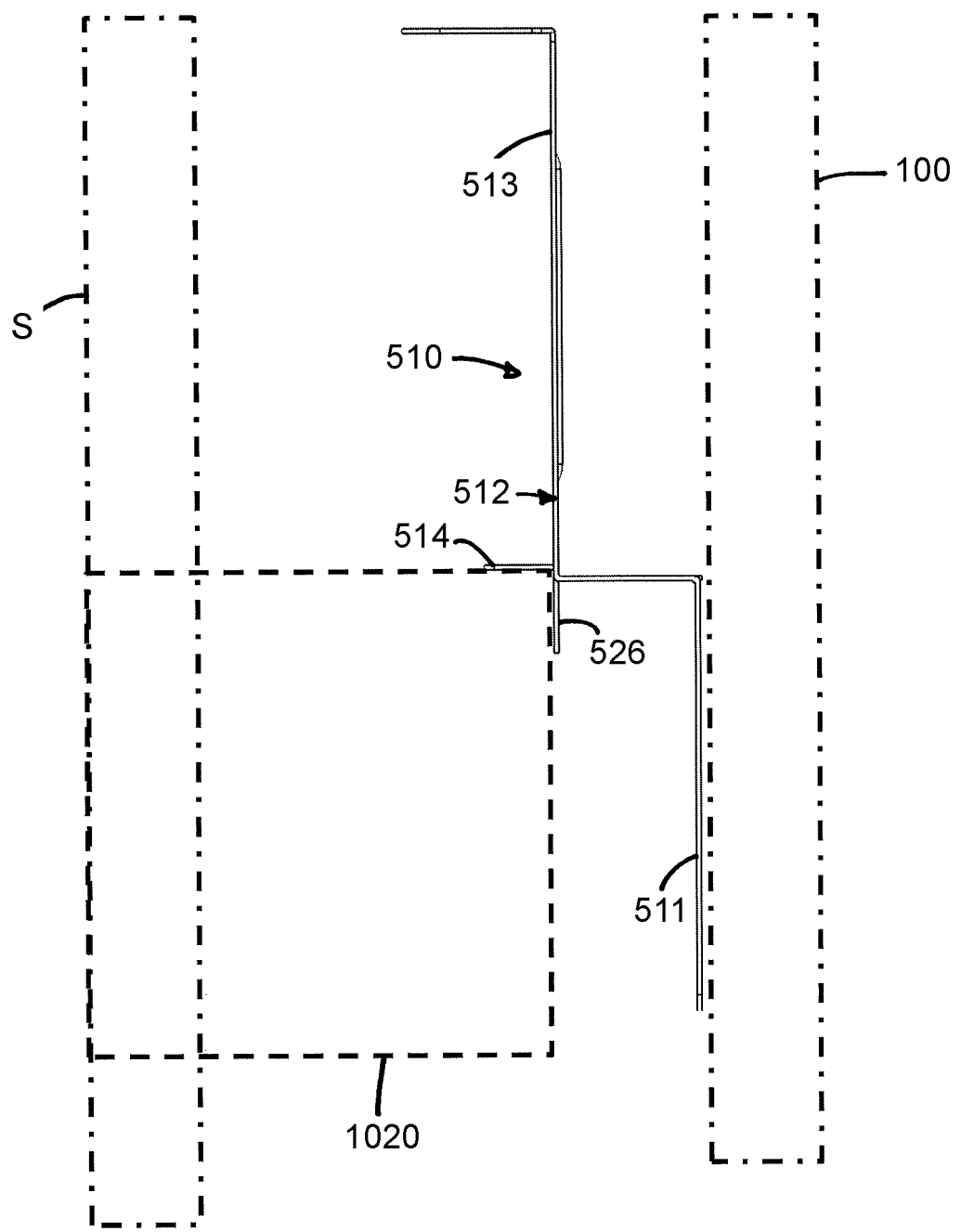
FIG. 32 is a side view of the support bracket shown in FIG. 25 in a second support configuration with schematic representations of an electrical box, a stud, and a second wall.
Figure 33:
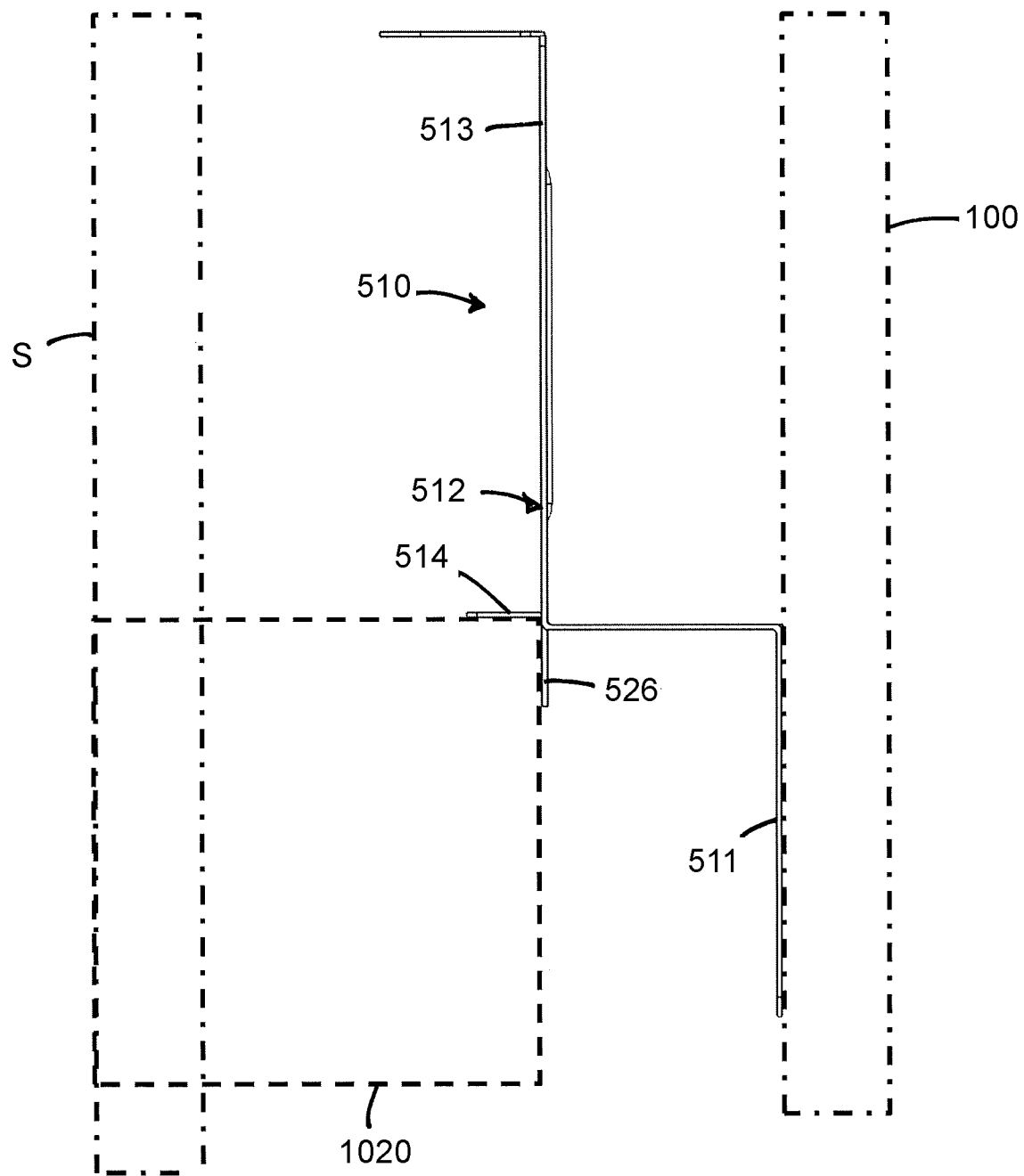
FIG. 33 is a side view of the support bracket shown in FIG. 25 in a third support configuration with schematic representations of an electrical box, a stud, and a second wall.
Figure 34:
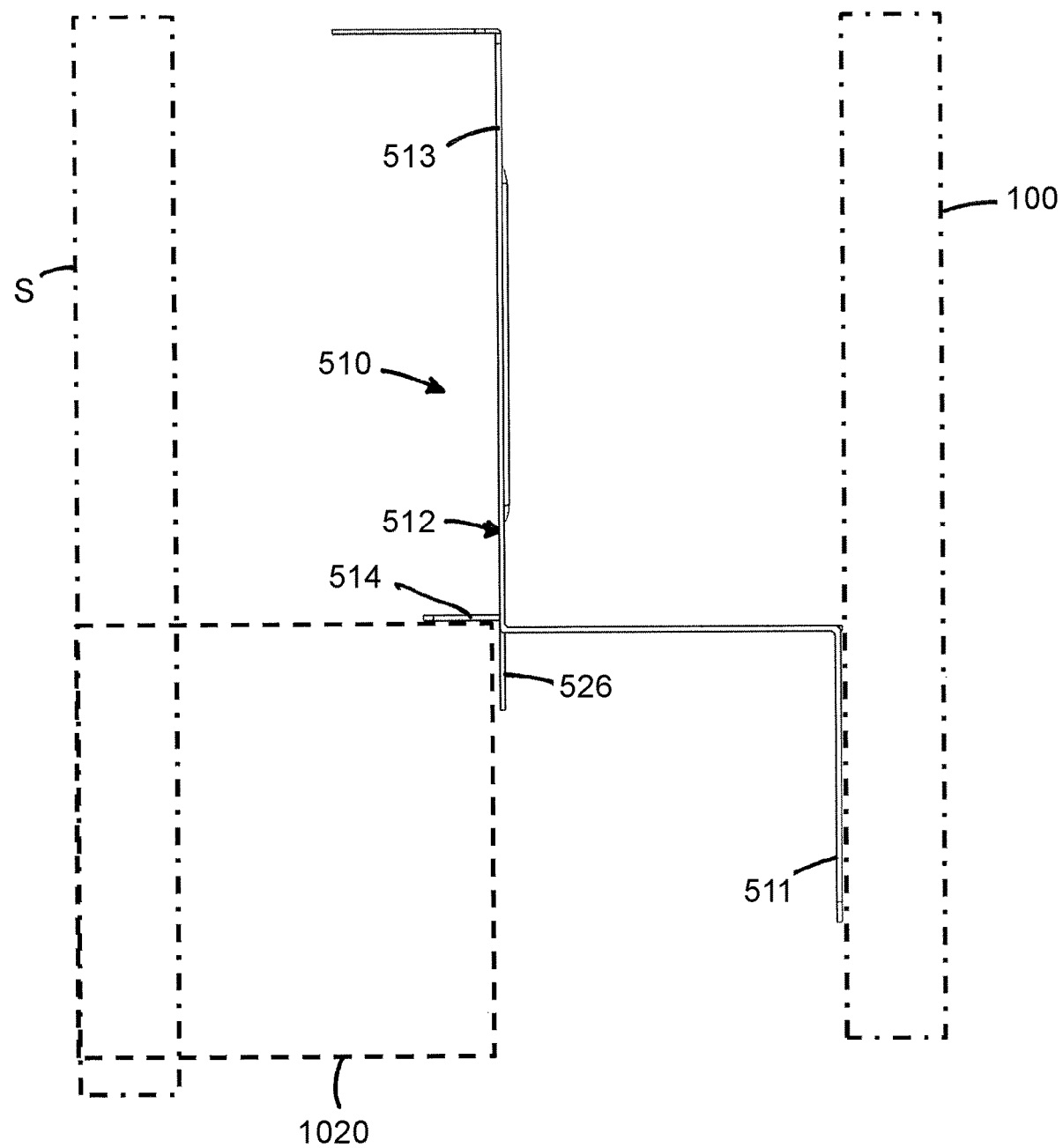
FIG. 34 is a side view of the support bracket shown in FIG. 25 in a fourth support configuration with schematic representations of an electrical box, a stud, and a second wall.
Figure 35:
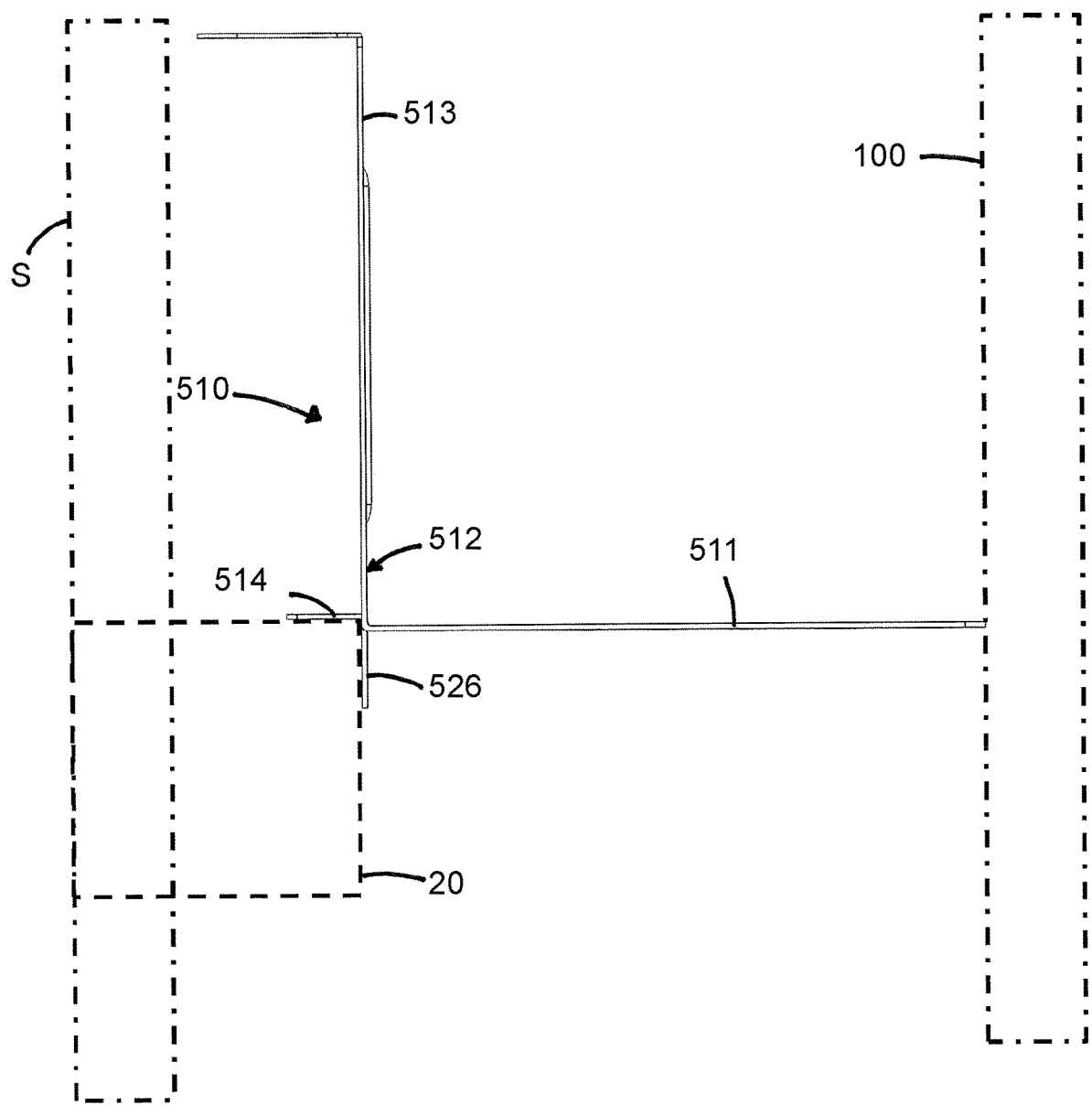
FIG. 35 is a side view of the support bracket shown in FIG. 25 in a fifth support configuration with schematic representations of an electrical box, a stud, and a second wall.

Referring to FIGS. 22-24, a support bracket for attaching to and supporting an electrical box 20 (or the like) within a wall cavity is generally indicated as reference numeral 500. In the exemplary embodiment, the electrical box 20 may be secured in the wall cavity by a mounting bracket (not shown) that attaches the electrical box to a stud S (FIGS. 31-35) of a wall (e.g., a metal wall stud). The Stud S is part of the first wall 102. Besides onto the stud S, electrical box 20 may also be attached to other part of the first wall 102, such as the dry wall (not shown). As is known in the art, mounting screws MS on the electrical box 20 are received in openings in the mounting bracket and tightened to connect the electrical box to the mounting bracket. An electrical or communications device (not shown) may also be secured in the electrical box 20. The orientation of the support bracket 510 in FIGS. 22-24 provides the point of reference for the terms defining relative locations and positions of structures and components of the bracket, including but not limited to the terms "upper," "lower," "left," "right," "top," "bottom," "front," "back," "forward," and "rearward," as used throughout the present disclosure.

In the exemplary embodiment, the support bracket 510 includes an elongate plate member 512 and the cable management member 41. The plate member 512 is configured to engage a back of the electrical box 20 along a lower section 511 of the plate member and at a front of the plate member.

As shown in FIGS. 22-24, the plate member 512 including the lower section 511 has a generally planar configuration. An upper section 513 of the plate member 512 extends above the electrical box 20. A locator tab 514 is bent from the plate member at an intermediate location between the upper and lower sections 513, 511. The locator tab 514 extends generally orthogonally from the plate member 512 over the top of the electrical box. The locator tab 514 is configured to engage a surface on the top of the electrical box to position the support bracket 510 vertically on the electrical box 20. In the illustrated embodiment, the locator tab 514 engages a flange of a connector mounting base 70 on the top of the electrical box 20 and provides a surface for receiving a screw 518 to attach the connector mounting base and the support bracket 510 to the electrical box. It will be understood, that the locator tab 514 could directly engage the top of the electrical box 20 to attach the support bracket 510 to the electrical box.

In the exemplary embodiment, the plate member 512 includes a plurality of bending lines 60 (FIG. 23). At least one of the bending lines 60 includes a tapered end 550. The bending line 60 divides the plate member 512 into a first portion 554 and a second portion 556. The plate member 512 has at least two configurations. In the first configuration, the plate member 512 is generally planar (FIG. 23). When the plate member is the second configuration, the first portion 554 bends along one of the bending line 60 and extends laterally from the second portion 556 to engage the second wall 100 (FIGS. 31-35). The bending lines may be formed by slots 520. As will be explained in greater detail below, the lower section 511 of the plate member 512 includes a plurality of slots 520 indicating bending locations on the plate member for adjusting a support dimension of the support bracket. Depending on where the plate member 512 is bent, the support bracket can be selectively configured to engage second wall 100 (e.g., drywall) opposite the back of the electrical box 20 to provide backside support to the electrical box. As an example, the support bracket 510 is suitable for use with the electrical boxes 20 having the following known sizes (length of upper and lower sides× length of left and right sides): 4×4 in, 4$^{11}$/$_{16}$×4$^{11}$/$_{16}$ in, 5×5 in, and 6×6 in. A cable management member 41 is bent from a top of the plate member 512 and extends laterally from the plate member and over the electrical box 20 when the support bracket is attached to the electrical box. The cable management member 41 is configured to secure cables (not shown) associated with an electrical or communications devices used with the electrical box 20. Accordingly, the support bracket provides a dual backside support and a cable containment function.

Referring to FIGS. 25-30, the support bracket 510 has a height H extending from a top of the support member to a bottom of the support member, and a width W extending between opposite side edges of the plate member 512. The height H of the support bracket 510 or the plate member 512 is greater than the height 548 (FIG. 24) of the electrical box. Each of the bending lines 60 is disposed across at least a majority of the width W of the plate member 512. In one embodiment, the height H is about 8 inches (20.3 cm), and the width W is about 2 inches (5.1 cm). The lower section 511 of the plate member 512 extends from a top of the locator tab 514 to the bottom of the plate member, and the upper section 513 of the plate member extends from the top of the locator tab to a top of the plate member. The locator tab 514 is bent from the plate member 512 in a forward direction such that the locator tab extends forwardly from the front of the plate member. The locator tab 514 is centered across the width W of the support bracket 510 and generally centered along the height H of the support bracket. In one embodiment, the top of the locator tab 514 is about 4 inches (10.2 cm) from the bottom of the plate member 512. As shown, the locator tab 514 has a generally rectangular shape having rounded corners. However, the locator tab 514 could have other shapes without departing from the scope of the disclosure. An open space 524 within the body of the plate member 512 is formed from the bent locator tab 514. A screw hole 525 is formed in the locator tab 514 for receiving the screw 518 to attach the support bracket 510 to the electrical box.

In the exemplary embodiment, a pair of engagement tabs 526 extend generally parallel to the height H of the support bracket 510 on lateral sides of the locator tab 514. Each engagement tab 526 extends from the upper section 513 of the plate member to a free end of the respective engagement tab. Sides of each of the engagement tabs 526 are spaced from adjacent portions of the plate member 512 forming gaps 528 around the engagement tabs. The gaps 528 communicate with the open space 524 left from the locator tab 514. This configuration allows the lower section 511 of the plate member 512 to be bent away from the engagement tabs 526 as will be explained in greater detail below.

When the lower section 511 of the plate member 512 is bent away from the engagement tabs 526, the engagement tabs will remain in contact with the back of the electrical box 20. In the illustrated embodiment, the engagement tabs 526 are generally rectangular. However, the engagement tabs 526 could have other shapes without departing from the scope of the disclosure. Broadly, the locator tab 514, engagement tabs 526, open space 524, and gaps 528 may form a tab formation disposed generally in a middle of the plate member 512.

In the exemplary embodiment, each of the slots 520 in the plate member 512 is located in the lower section 511 of the plate member. A first pair of slots 520A are located on opposite sides of the tab formation and are vertically aligned with each other such that they are positioned at the same height along the plate member 512. The slots 520A are elongate and extend generally parallel to the width W of the support bracket 510. Longitudinal ends of the slots 520A are rounded. The slots 520A are positioned slightly below the locator tab 514. In one embodiment, the slots 520A are located a distance D1 about 3.9 inches (9.9 cm) from the bottom of the plate member 512. A second pair of slots 520B are also located on opposite sides of the tab formation and are vertically aligned with each other such that they are positioned at the same height along the plate member 512. The slots 520B are elongate and extend generally parallel to the width W of the support bracket 510.

In the exemplary embodiment, longitudinal ends of the slots 520B are rounded. The second pair of slots 520B are positioned below the first pair of slots 520A. In one embodiment, the slots 520B are located a distance D2 about 0.4 inches (1.0 cm) from the first pair of slots 520A and a distance D3 about 3.5 inches (8.9 cm) from the bottom of the plate member 512. A third slot 520C is located below the tab formation and centered across the width W of the support bracket 510. The slot 520C is elongate and extends generally parallel to the width W of the support bracket 510. In one embodiment, the slot 520C extends over half of the width W of the support bracket. Longitudinal end margins of the slot 520C angle upward. Longitudinal ends of the slot 520C are rounded. The third slot 520C is positioned below the first and second pair of slots 520A, 520B. In one embodiment, the slot 520C is located a distance D4 about 1 inch (2.5 cm)

from the first pair of slots 520A and a distance D5 about 2.9 inches (7.3 cm) from the bottom of the plate member 512.

In the exemplary embodiment, a fourth slot 520D is located below the tab formation and centered across the width W of the support bracket 510. The slot 520D is elongate and extends generally parallel to the width W of the support bracket 510. In one embodiment, the slot 520D extends over half of the width W of the support bracket. Longitudinal end margins of the slot 520D angle upward. Longitudinal ends of the slot 520D are rounded. The fourth slot 520D is positioned below the first, second and third of slots 520A, 520B, 520C. In one embodiment, the slot 520D is located a distance D6 about 1.5 inches (3.8 cm) from the first pair of slots 520A and a distance D7 about 2.4 inches (6.1 cm) from the bottom of the plate member 512. A fifth slot 520E is located below the tab formation and centered across the width W of the support bracket 510. The slot 520E is elongate and extends generally parallel to the width W of the support bracket 510. In one embodiment, the slot 520E extends over half of the width W of the support bracket. Longitudinal end margins of the slot 520E angle upward. Longitudinal ends of the slot 520E are rounded. The fifth slot 520E is positioned below the first, second, third and fourth of slots 520A, 520B, 520C, 520D. In one embodiment, the slot 520E is located a distance D8 about 2.1 inches (5.3 cm) from the first pair of slots 520A and a distance D9 about 1.8 inches (4.6 cm) from the bottom of the plate member 512.

In the exemplary embodiment, a pair of elongate support ribs 532 (FIGS. 22-28) extend along a portion of the upper section 513 of the plate member 512. In the illustrated embodiment, the support ribs 532 extend generally parallel to the height H of the support bracket 510. However, the support ribs 532 could be configured in other ways without departing from the scope of the disclosure. For example, the support ribs 532 could extend transverse to the height H of the support bracket and/or along a greater or lesser extent of the upper section 513 of the plate member 512. Additionally, the ribs could extend into the lower section 511 of the plate member 512. Alternatively, separate ribs could be formed in the lower section 511 of the plate member 512. In one embodiment, the upper section 513 has a height of about 4 inches (10.2 cm).

Referring to FIGS. 25, 26, 29, and 30, the cable management member 41 is bent from the top of the plate member 512 in a forward direction such that the management member extends forwardly from the front of the plate member. In one embodiment, the cable management member 41 extends orthogonally from the plate member 512. The cable management member 41 includes a center portion 534 and a pair of side portions 536 extending from the center portion. The center portion 534 defines a hole 538 for receiving a driver (not shown) to engage the screw 518 for attaching the support bracket 510 to the electrical box 20. Each side portion 536 extends laterally from the center portion and curves back toward the plate member 512 to form a generally pass-through opening 540 for receiving cables associated with an electrical or communications device secured in the electrical box 20. As such, the side portions 536 include a first section 542 at a forward most end, a second section 544 that extends from the first section and curves around toward the plate member 512, and a third section 546 that extends from the second section toward the plate member. The first and second sections 542, 544 are relatively thick as compared to the third section 546 to provide some rigidity to the cable management member 41. The third section 546 is relatively thin so as to allow the third section to be bent or flexed to permit cables to be removed from the pass-through openings if desired. To this same effect, the third sections 546 of the side portions 536 do not extend all the way to the plate member 512 such that the side portions each have a free end adjacent the plate member. In one embodiment, the cable management member 41 is configured to secure MC cables in each of the pass-through openings 540. Because the upper section 513 of the plate member 512 extends about 4 inches (10.2 cm) from the top of the electrical box 20, the cables will be secured relatively close to the electrical box. The pass-through openings 540 may be sized to receive cable up to 10 AWG. However, other opening sizes are also envisioned within the scope of the disclosure.

Referring to FIGS. 31-35, the support bracket 510 is configurable in a number of different configurations to provide the necessary backside support for the electrical box 20. The support bracket 510 may be configurable in a first support configuration (FIG. 31) where the lower section 511 of the plate member 512 is bent a first time along the first pair of slots 520A to extend a portion of the lower section below the first pair of slots rearward from the electrical box 20, and bent a second time along the second pair of slots 520B to extend a portion of the lower section below the second pair of slots downward generally parallel to the upper section 513 of the plate member. In one embodiment, the portion of the lower section 511 of the plate member 512 between the first pair of slots 520A and the second pair of slots 520B extends generally orthogonally to the upper section 513. The first support configuration is configured to provide the necessary backside support for a 2⅛ inch (5.4 cm) deep electrical box 20 attached flush with an outer surface of a 2½ inch (6.4 cm) deep stud S whereby the portion of the lower section 511 of the plate member 512 below the second pair of slots 520B will engage the second wall 100 opposite the electrical box to resist forces pushing the electrical box into the wall cavity.

The support bracket 510 may be configurable in a second support configuration (FIG. 32) where the lower section 511 of the plate member 512 is bent a first time along the first pair of slots 520A to extend a portion of the lower section 511 below the first pair of slots rearward from the electrical box 20, and bent a second time along the third slot 520C to extend a portion of the lower section below the third slot downward generally parallel to the upper section 513 of the plate member. In one embodiment, the portion of the lower section 511 of the plate member 512 between the first pair of slots 520A and the third slot 520C extends generally orthogonally to the upper section 513. The second support configuration is configured to provide the necessary backside support for a 1½ inch (3.8 cm) deep electrical box 1020 attached flush with an outer surface of a 2½ inch (6.4 cm) deep stud S whereby the portion of the lower section 511 of the plate member 512 below the third slot 520C will engage the second wall 100 opposite the electrical box to resist forces pushing the electrical box into the wall cavity.

The support bracket 510 may be configurable in a third support configuration (FIG. 33) where the lower section 511 of the plate member 512 is bent a first time along the first pair of slots 520A to extend a portion of the lower section below the first pair of slots rearward from the electrical box 20, and bent a second time along the forth slot 520D to extend a portion of the lower section below the fourth slot downward generally parallel to the upper section 513 of the plate member. In one embodiment, the portion of the lower section 511 of the plate member 512 between the first pair of slots 520A and the fourth slot 520D extends generally orthogonally to the upper section 513. The third support configuration is configured to provide the necessary backside support for a 2⅛ inch (5.4 cm) deep electrical box 20 attached flush with an outer surface of a 3⅝ inch (9.2 cm) deep stud S whereby the portion of the lower section 511 of the plate member 512 below the fourth slot 520D will engage the second wall 100 opposite the electrical box to resist forces pushing the electrical box into the wall cavity.

The support bracket 510 may be configurable in a fourth support configuration (FIG. 34) where the lower section 511 of the plate member 512 is bent a first time along the first pair of slots 520A to extend a portion of the lower section below the first pair of slots rearward from the electrical box 20, and bent a second time along the fifth slot 520E to extend a portion of the lower section below the fifth slot downward generally parallel to the upper section 513 of the plate member. In one embodiment, the portion of the lower section 511 of the plate member 512 between the first pair of slots 520A and the fifth slot 520E extends generally orthogonally to the upper section 513. The fourth support configuration is configured to provide the necessary backside support for a 1½ inch (3.8 cm) electrical box 1020 attached flush to an outer surface of a 3⅝ (9.2 cm) inch deep stud S whereby the portion of the lower section 511 of the plate member 512 below the fifth slot 520E will engage the second wall 100 opposite the electrical box to resist forces pushing the electrical box into the wall cavity.

The support bracket 510 may be configurable in a fifth support configuration (FIG. 35) where the lower section 511 of the plate member 512 is bent along the first pair of slots 520A to extend the lower section below the first pair of slots rearward from the electrical box 20. In one embodiment, the lower section 511 of the plate member 512 extends generally orthogonally to the upper section 513. The fifth support configuration is configured to provide the necessary backside support for a 2⅛ inch (5.4 cm) deep electrical box 20 attached flush with an outer surface of a 6 inch (15.2 cm) deep stud S whereby the lower section 511 of the plate member 512 will engage the second wall 100 opposite the electrical box. Accommodations for other dimensions of the electrical box 20 and stud S are within the scope of the present disclosure. Thus, it will be understood that the height H of the support bracket 510 and the positions of the slots 520 can be modified to accommodate any particular electrical box and stud depth. As such, the support bracket 510 is configured to have an adjustable depth in order to match the depth of the electrical box 20 and stud S to which the support bracket is attached to resist forces pushing the electrical box into the wall cavity. The support bracket 510 may be formed as a unitary, one-piece construction. The support bracket 510 can be formed from a single sheet metal (e.g., steel or aluminum) that is cut and bent into shape or from any other suitable material.

The bending configurations of the plate member 512 are not limited to those described above. Instead of slots 520A, the plate member 512 may first bent along other slots 520B, 520C, 520D, 520E. The plate member 512 may then bent along the remaining slots below the first bent slot(s).

Figure 36:
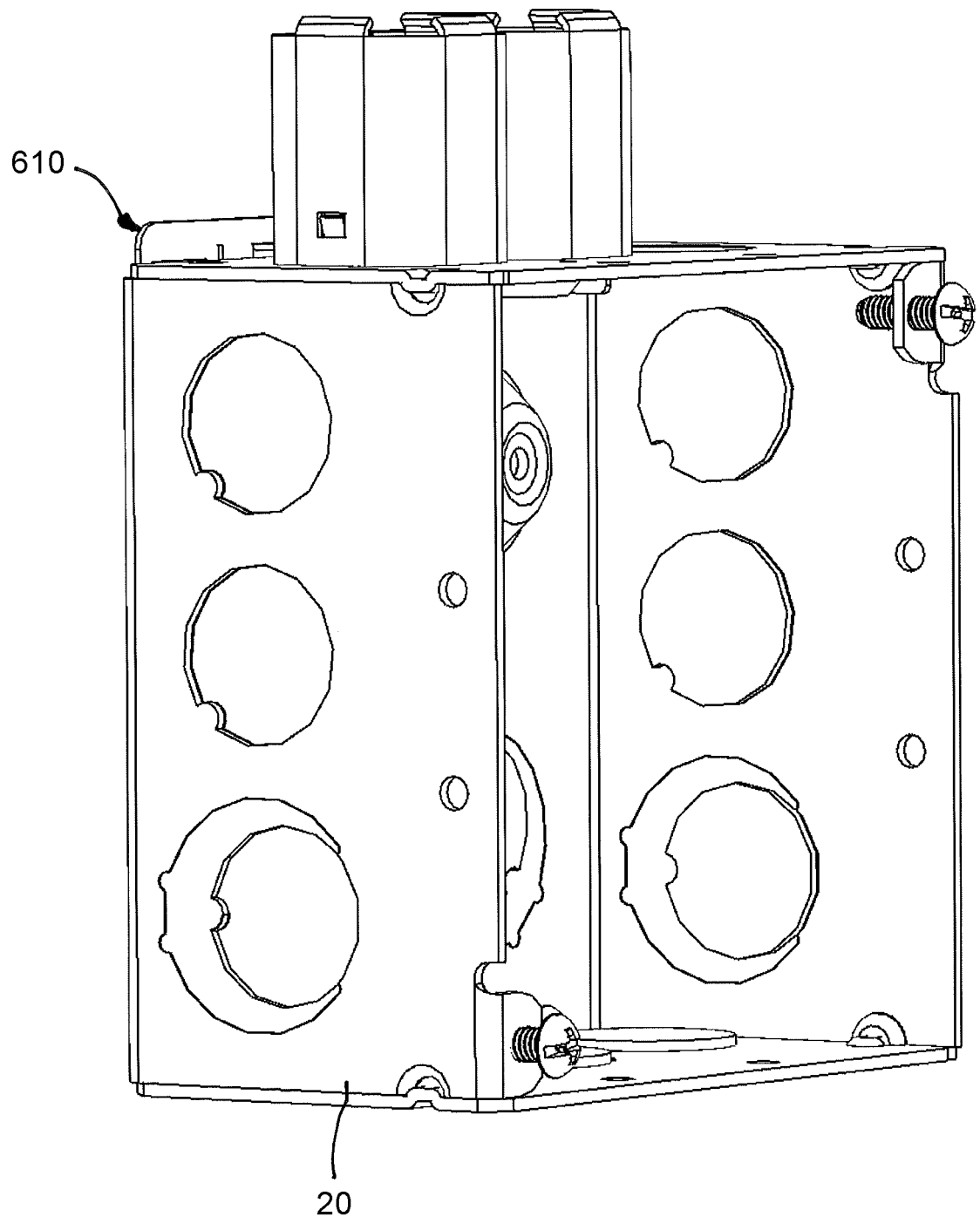
FIG. 36 is a front perspective view of another exemplary support bracket attached to an electrical box.
Figure 37:
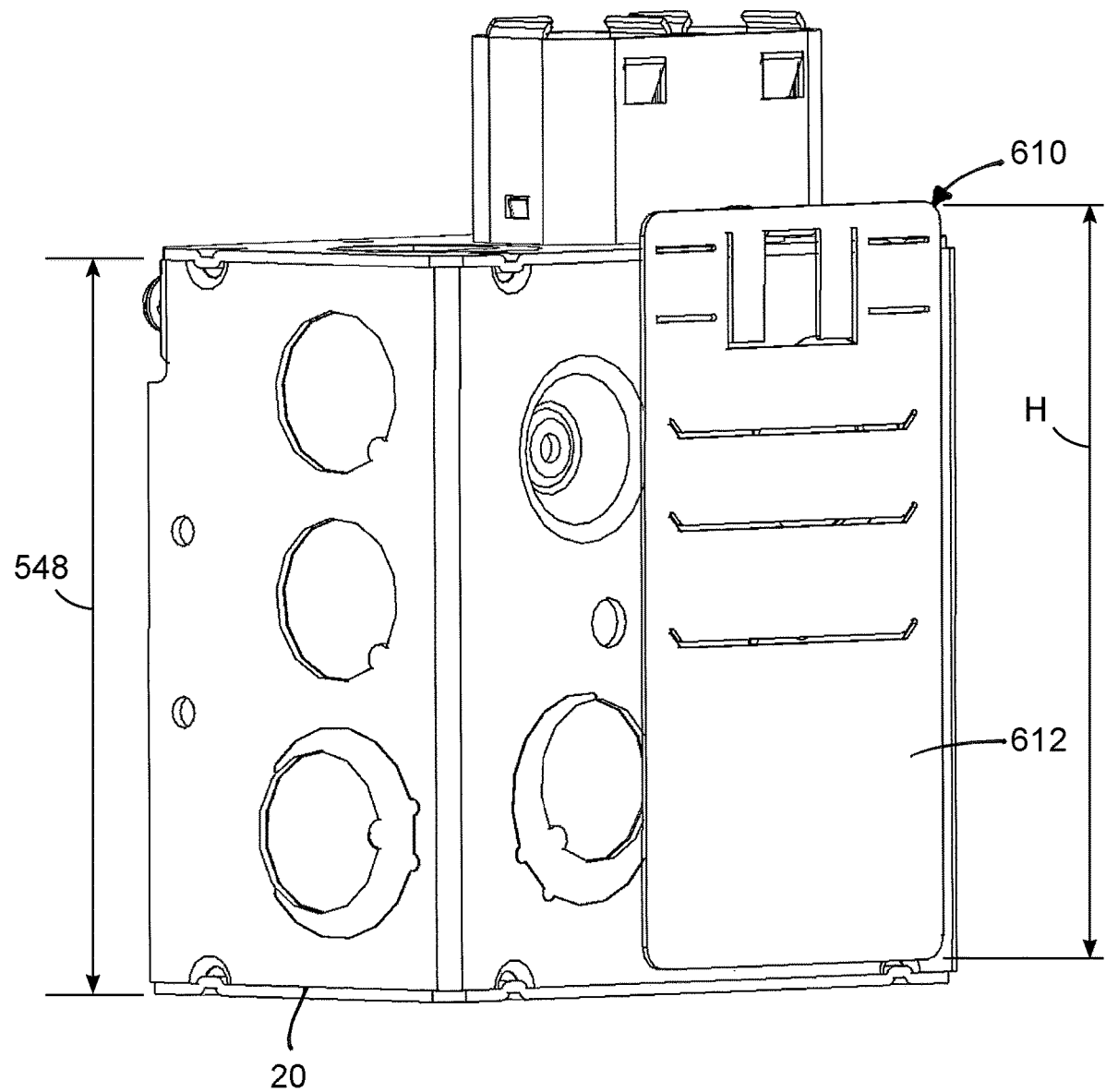
FIG. 37 is a rear perspective view of the support bracket and electrical box shown in FIG. 36.
Figure 38:
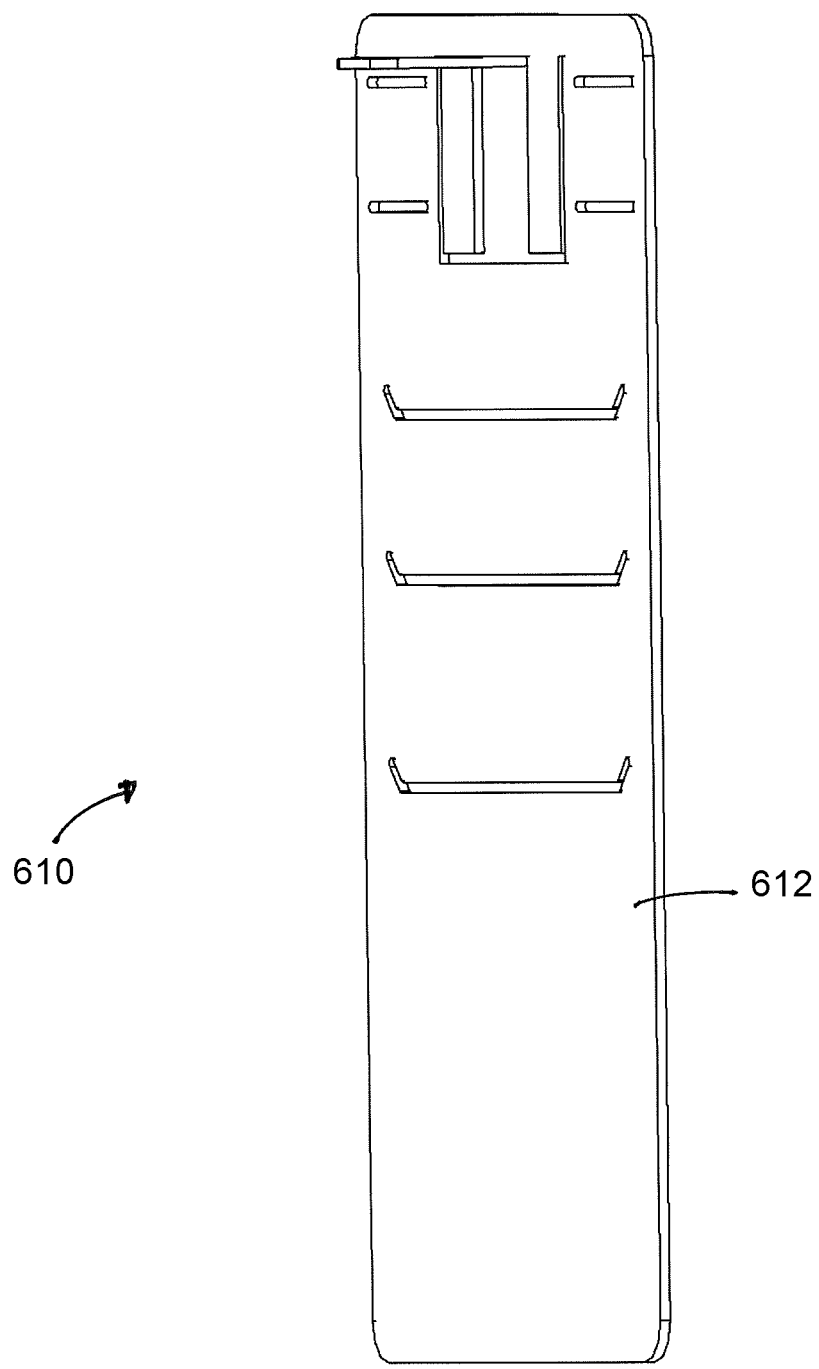
FIG. 38 is a perspective view of the support bracket shown in FIG. 36.
Figure 39:
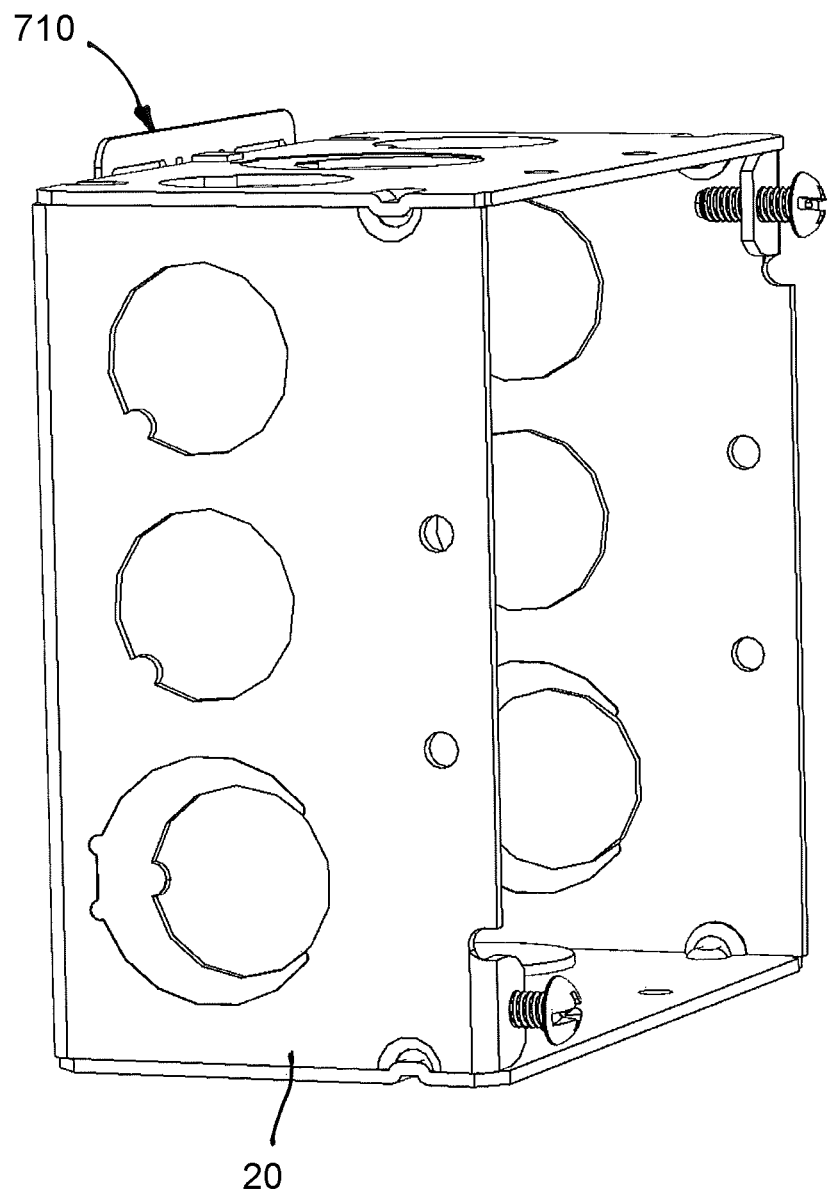
FIG. 39 is a front perspective view of another exemplary support bracket attached to an electrical box.
Figure 40:
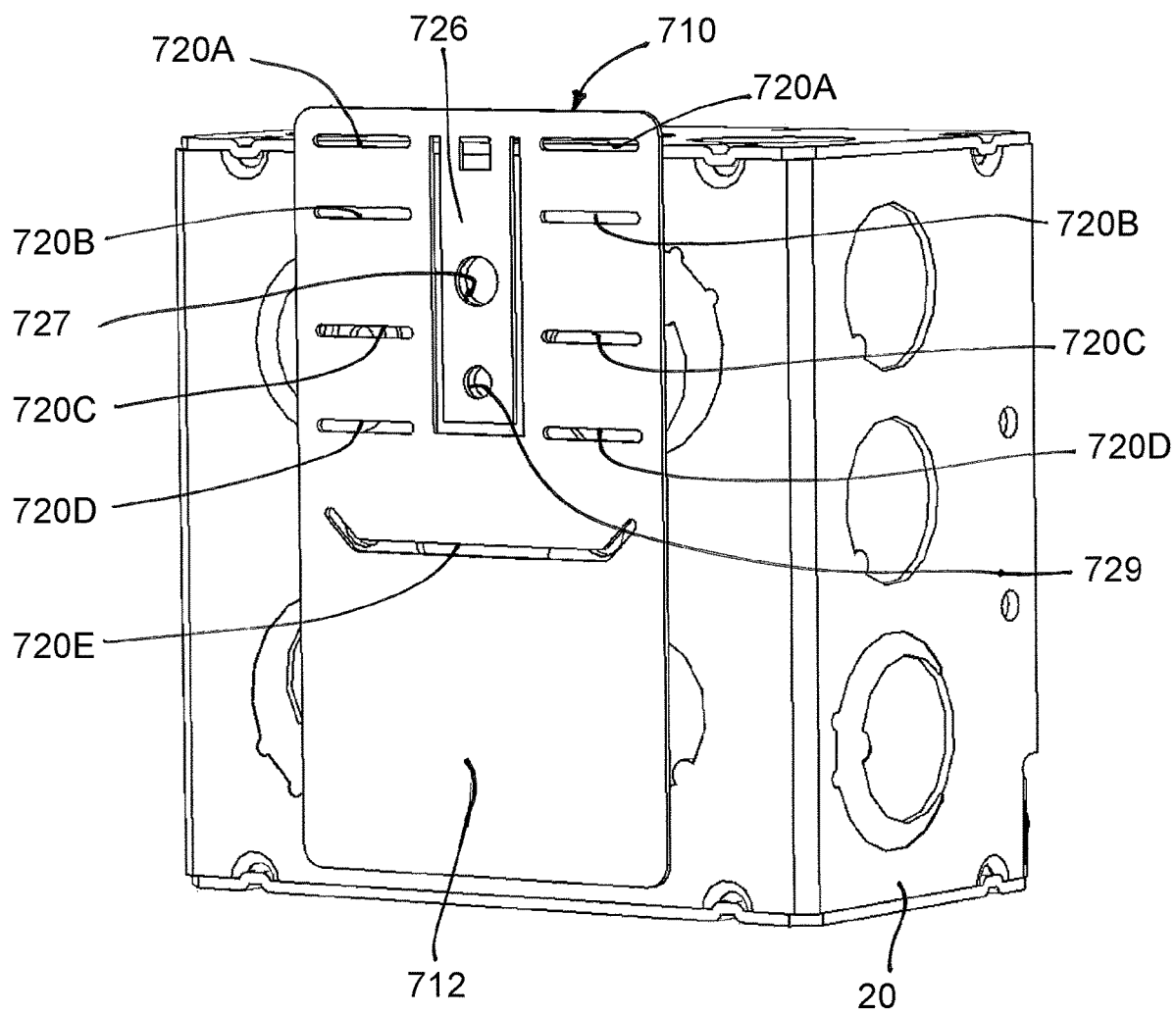
FIG. 40 is a rear perspective view of the support bracket and electrical box shown in FIG. 39.
Figure 41:
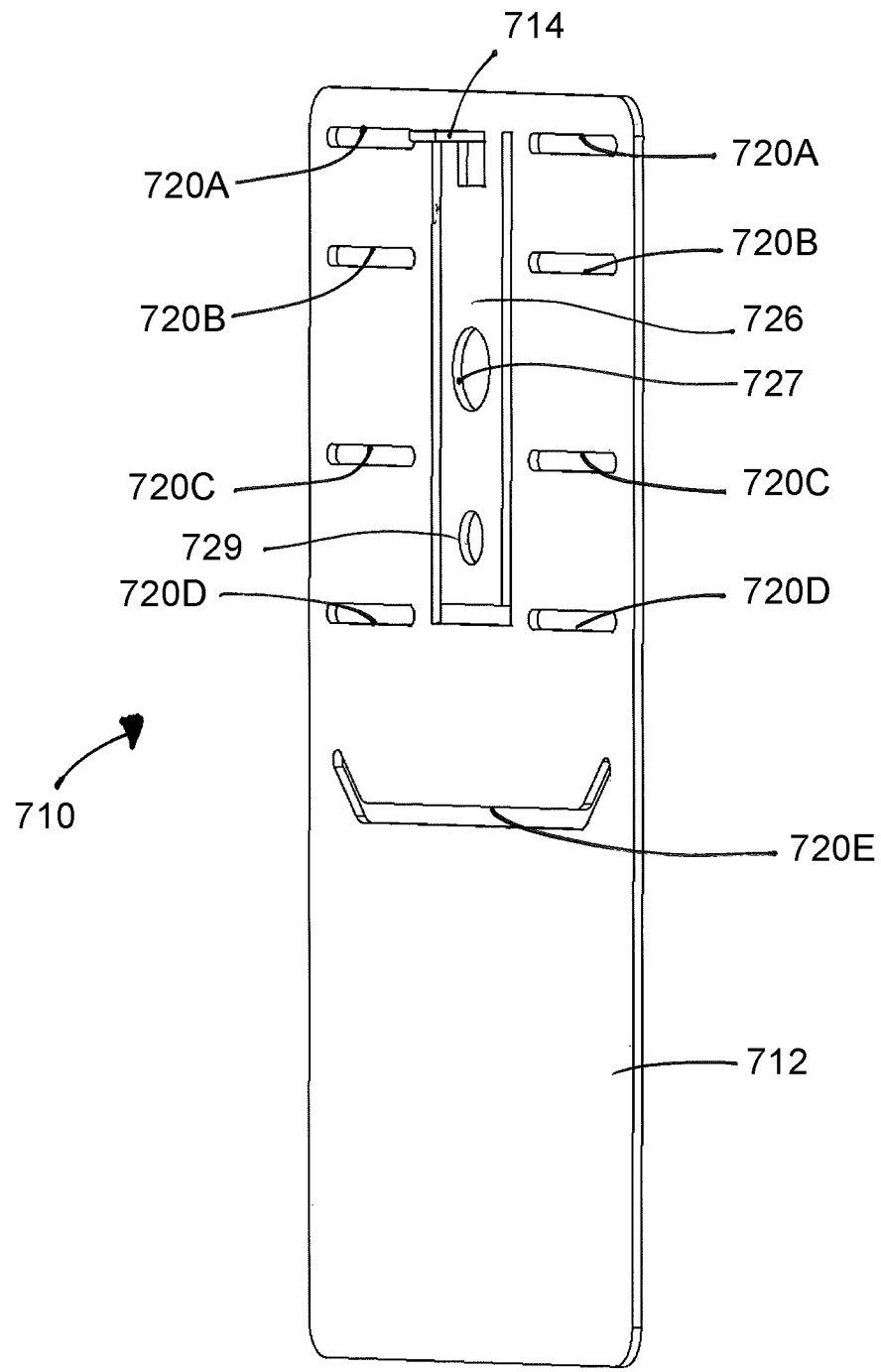
FIG. 41 is a perspective view of the support bracket shown in FIG. 39.
Figure 42:
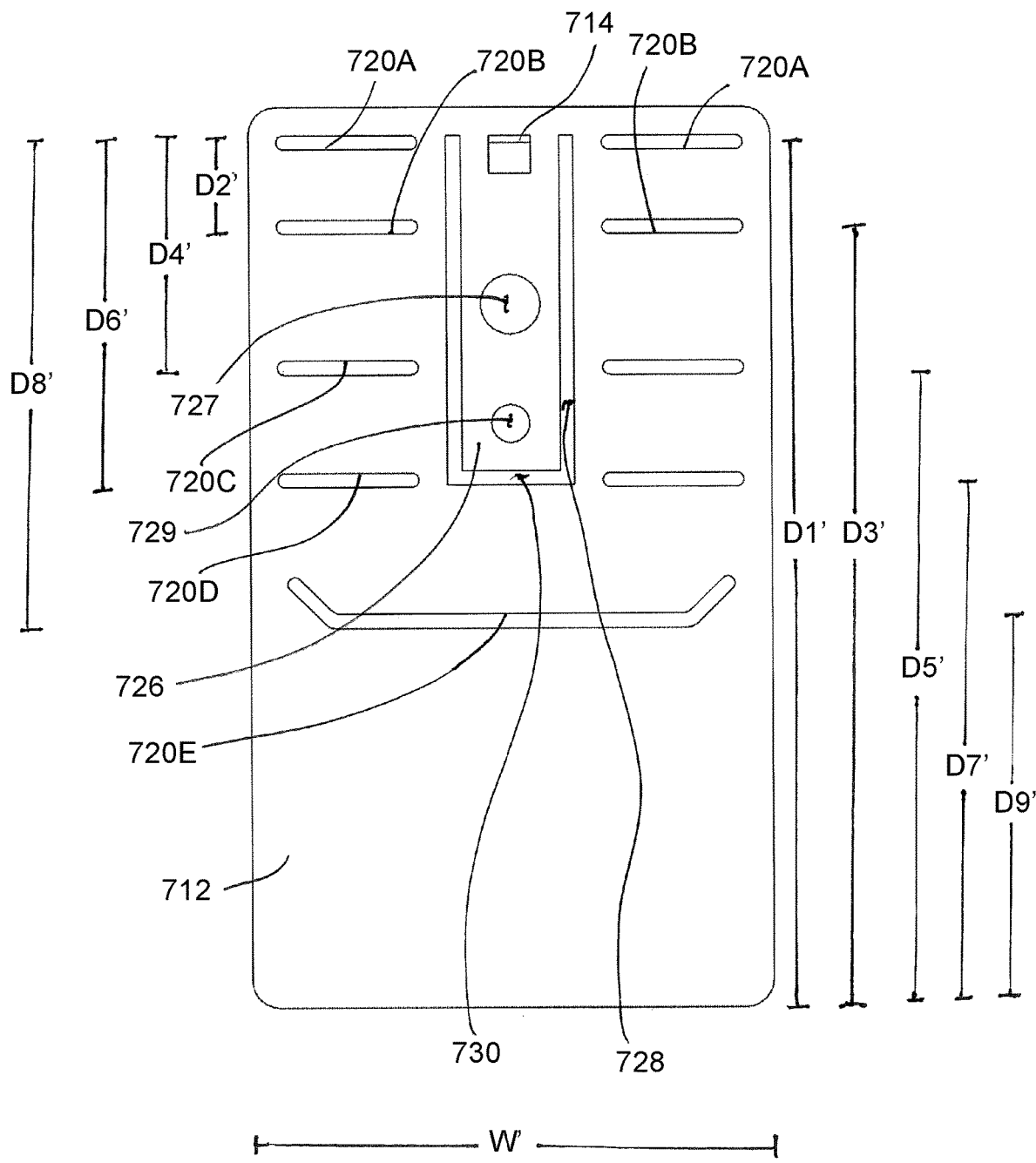
FIG. 42 is a front view of the support bracket shown in FIG. 41.

Referring to FIGS. 36-38, another embodiment of a support bracket for attaching to and supporting an electrical box 20 (or the like) within a wall cavity is generally indicated at reference numeral 610. Support bracket 610 is similar to support bracket 510 and, thus, for ease of comprehension, where similar or analogous parts are used, reference numerals "600" units higher are employed. Support bracket 610 is the same as support bracket 510 except that the upper section of plate member 612 and the cable management member have been removed. The height H of the support bracket 610 or the plate member 612 is substantially equal to the height 548 of the electrical box 20.

Therefore, the support bracket 610 does not provide the cable containment feature. The support bracket 610 otherwise includes the same elements and provides the same backside support features as support bracket 510.

Referring to FIGS. 39-42, another embodiment of a support bracket for attaching to and supporting an electrical box 20 (or the like) within a wall cavity is generally indicated at reference numeral 710. Support bracket 710 is similar to support bracket 510 and, thus, for ease of comprehension, where similar or analogous parts are used, reference numerals "700" units higher are employed. Support bracket 710 is similar to support bracket 510 except that the upper section of plate member 712 and the cable management member have been removed and the plate member includes a different locator tab 714 and engagement tab 726 configuration.

Additionally, at least some of the slots 720 are configured differently. The support bracket 710 otherwise provides the same backside support features as support bracket 510.

In the exemplary embodiment, the locator tab 714 has a smaller width dimension than the locator tab 514 of the first embodiment and is free of any fastener holes because the locator tab 714 is not used to receive a screw to attach the support bracket 710 to the electrical box 20. Rather, the locator tab 714 seats on the top of the electrical box 20 to locate the support bracket 710 vertically on the electrical box. The engagement tab 726 is disposed at a midpoint across the width W' of the plate member 712 and defines first and second holes 727, 729 for receiving rivets (not shown) to attach the support bracket 710 to the electrical box 20. The engagement tab 726 extends from an upper section of the plate member 712 to a free end of the engagement tab. Longitudinal sides of the engagement tab 726 are spaced from adjacent portions of the plate member 712 forming gaps 728 around the engagement tab. The gaps 728 communicate with an open space 730 below the free end of the engagement tab 726. This configuration allows a lower section of the plate member 712 to be bent away from the engagement tab 726. When the lower section of the plate member 712 is bent away from the engagement tab 726 the engagement tab will remain in contact with the back of the electrical box 20. In the illustrated embodiment, the engagement tab 726 is generally rectangular. However, the engagement tab 726 could have other shapes without departing from the scope of the disclosure. Broadly, the locator tab 714, engagement tab 726, open space 730, and gaps 728 may form a tab formation disposed generally in a middle of the plate member 712.

In the exemplary embodiment, a first pair of slots 720A are located on opposite sides of the tab formation and are vertically aligned with each other such that they are positioned at the same height along the plate member 712. The slots 520A are elongate and extend generally parallel to the width W' of the support bracket 510. Longitudinal ends of the slots 720A are rounded. The slots 720A are positioned generally at the same height of the locator tab 714. In one embodiment, the slots 720A are located a distance D1' about 3.9 inches (9.9 cm) from the bottom of the plate member 712. A second pair of slots 720B are also located on opposite sides of the tab formation and are vertically aligned with each other such that they are positioned at the same height along the plate member 712. The slots 720B are elongate and extend generally parallel to the width W' of the support bracket 710. Longitudinal ends of the slots 720B are rounded. The second pair of slots 720B are positioned below the first pair of slots 720A. In one embodiment, the slots 720B are located a distance D2' about 0.4 inches (1.0 cm) from the first pair of slots 720A and a distance D3' about 3.5 inches (8.9 cm) from the bottom of the plate member 712. A third pair of slots 720C is located on opposite sides of the tab formation and are vertically aligned with each other such that they are positioned at the same height along the plate member 712. The slots 720C are elongate and extend generally parallel to the width W' of the support bracket 710. Longitudinal ends of the slots 720C are rounded. The third pair of slots 720C are positioned below the first and second pair of slots 720A, 720B. In one embodiment, the slots 720C are located a distance D4' about 1 inch (2.5 cm) from the first pair of slots 720A and a distance D5' about 2.9 inches (7.3 cm) from the bottom of the plate member 712. A fourth pair of slots 720D are located on opposite sides of the tab formation and are vertically aligned with each other such that they are positioned at the same height along the plate member 712. The slots 720D are elongate and extend generally parallel to the width W' of the support bracket 710. Longitudinal ends of the slots 720D are rounded. The fourth pair of slots 720D are positioned below the first, second, and third pair of slots 720A, 720B, 720C. In one embodiment, the slots 720D are located a distance D6' about 1.5 inch (3.8 cm) from the first pair of slots 720A and a distance D7' about 2.4 inches (6.1 cm) from the bottom of the plate member 712. A fifth slot 720E is located below the tab formation and is centered across the width W' of the support bracket 710. The slot 720E is elongate and extends generally parallel to the width W' of the support bracket 710. In one embodiment, the slot 720E extends over half of the width W' of the support bracket.

In the exemplary embodiment, longitudinal end margins of the slot 720E angle upward. Longitudinal ends of the slot 720E are rounded. The fifth slot 720E is positioned below the first, second, third and fourth slots 720A, 720B, 720C, 720D. In one embodiment, the slot 720E is located a distance D8' about 2.1 inches (5.3 cm) from the first pair of slots 720A and a distance D9' about 1.8 inches (4.6 cm) from the bottom of the plate member 712.

The electrical box assemblies and system described may be provided in kit form as a set of modular components that can be conveniently mixed and matched to assemble as needed at different installation sites. For example, a kit can be provided including an electrical box, a connector mounting base, a support bracket to more or less universally meet the needs of a broad range of installations.

As another example, a kit can be provided including an electrical box and a connector mounting base, with the installer optionally obtaining a support bracket for a particular installation.

As still another example, a kit can be provided including a number of connector mounting bases, a number of support brackets and a number of support brackets that can assembled to standard electrical boxes that are separately provided.

Moreover, kits of support brackets may be provided including a number of brackets having respectively different length to account for different front and rear wall spacing at the point of installation of an electrical box. An installer may simply select a bracket from the kit of brackets having the length needed, and over the course of different jobs may use all of the brackets in the different lengths provided.

Numerous other variations in kits are possible including elements of the inventive brackets and support assemblies described above as those in the art would undoubtedly realize. An installer having access to such kits or inventories of the components may assemble support systems at different installations with ease.

Various embodiments of support brackets for electrical box assemblies are described herein that include a cable management member and also provide support for the electrical box, thereby containing electrical cables and limiting the electrical box from being pushed into the wall cavity. The support brackets include a plurality of folding lines for the part of the support brackets extending laterally to the second wall having various lengths, thereby accommodating various configurations of electrical boxes and wall cavities. Clips of the support bracket allow easy coupling of the support bracket to the electrical box, thereby simplifying and reducing the cost of installation. The support brackets are intuitively used and easy to install, while being provided at relatively low cost. Support brackets may be entirely above the electrical box or may be coupled to the top wall of the electrical box, thereby providing quick and easy installation of the electrical box assemblies.

Embodiments of electrical box assemblies have been described including support brackets in combination with connector mounting bases and electrical boxes. The support brackets include clips that facilitate slidable attachment to the connector mounting bases without tools. The connector mounting base is, in turn, fastened to an electrical box, and specifically to a top wall of the electrical box. The clip attachment of the support brackets eliminates direct connection of the support brackets to the electrical box and simplifies installation steps. Modular assembly kits may be provided to meet the needs of different installation sites.

While exemplary embodiments of components, assemblies and systems are described, variations of the components, assemblies and systems and possible to achieve similar advantages and effects. Specifically, the shape and the geometry of the components and assemblies, and the relative locations of the components in the assembly, may be varied from that described and depicted without departing from inventive concepts described. Also, in certain embodiments, certain components in the assemblies described may be omitted to accommodate particular types of support brackets and electrical box assemblies or the needs of particular installations, while still providing the needed performance and functionality of the support brackets and electrical box assemblies.

The benefits and advantages of the inventive concepts are now believed to have been demonstrated in the exemplary embodiments disclosed.

An embodiment of an electrical box assembly to be mounted on a first wall has been disclosed. The electrical box assembly includes an electrical box and a support bracket. The electrical box has a top wall, a bottom wall opposing the top wall, a front wall, and a back wall opposing the front wall, wherein the front wall provides an access to the electrical box. The support bracket is positioned proximate the back wall of the electrical box and coupled to the electrical box. The support bracket includes a plate member and a cable management member extending laterally from the plate member, the cable management member forming at least one pass-through opening sized to receive an electrical cable that is further received in the electrical box. The plate member includes a bending line that divides the plate member into a first portion and a second portion. The plate member has first and second configurations. The plate member is generally planar in the first configuration. When the plate member is in the second configuration, the first portion of the plate member bends along the bending line and extends laterally from the second portion to engage a second wall opposing the first wall and opposing the back wall of the electrical box.

Optionally, the support bracket further includes at least one clip sized to slidably couple the support bracket to the electrical box. The electrical box assembly further includes a connector mounting base positioned above and attached to the top wall of the electrical box, wherein the clip is sized to slidably engage the support bracket to the connector mounting base. The plate member includes a lower section proximate the top wall of the electrical box and an upper section opposing the lower section, the at least one clip including a plurality of clips positioned at the lower section and formed integrally with the plate member, the plurality of clips bending out of plane from the plate member and engaging the connector mounting base. The at least one clip extends from the plate member and is resiliently deflectable relative to the plate member. The plate member includes a proximate end proximate the top wall of the electrical box and a distal end opposing the proximate end, the plate member further including a plurality of locator tabs extending from the proximate end, the electrical box including a plurality of slots disposed on the top wall of the electrical box and sized to receive the plurality of locator tabs. The support bracket is entirely positioned above the electrical box. The plate member includes a main member and a support member, the support member surrounds the main member on lateral sides of the main member and forms two lateral gaps between the support member and the main member, and the bending line is disposed below the two lateral gaps.

Another embodiment of an electrical box assembly to be mounted on a first wall is provided. The electrical box assembly includes an electrical box, a connector mounting base, and a support bracket. The electrical box has a top wall, a bottom wall opposing the top wall, a front wall, and a back wall opposing the front wall, wherein the front wall provides an access to the electrical box. The connector mounting base is positioned above and attached to the top wall of the electrical box, the connector mounting base including a front facing in the same direction as the front wall of the electrical box and a back opposing the front, wherein the connector mounting base is sized to receive an electrical cable. The support bracket is positioned above the electrical box and proximate the back wall of the electrical box and the back of the connector mounting base, the support bracket indirectly coupled to the electrical box through the connector mounting base. The support bracket includes a plate member and a cable management member extending laterally from the plate member, the cable management member forming a pass-through opening sized to receive an electrical cable that is further received in the connector mounting base and further in the electrical box. The support bracket further includes at least one clip sized to slidably engage the support bracket to the connector mounting base.

Optionally, the plate member includes a lower section proximate the top wall of the electrical box and an upper section opposing the lower section, the at least one clip including a plurality of clips positioned on the lower section of the plate member and formed integrally with the plate member, the plurality of clips bending out of plane from the plate member and engaging the connector mounting base. The at least one clip extends from the plate member and is resiliently deflectable relative to the plate member. The plate member includes a proximate end proximate the top wall of the electrical box and a distal end opposing the proximate end, the plate member further including a plurality of locator tabs extending from the proximate end, the electrical box including a plurality of slots disposed on the top wall of the electrical box and sized to receive the plurality of locator tabs. The plate member includes a main member and a support member, the support member surrounding the main member on lateral sides of the main member and forming two lateral gaps between the support member and the main member. The support member further includes a bending line that is disposed below the two lateral gaps and divides the support member into a first portion and a second portion. The plate member has first and second configurations. The plate member is generally planar in the first configuration. When the plate member is in the second configuration, the first portion of the support member bends along the bending line and extends laterally from the second portion of the support member to engage a second wall opposing the first wall and opposing the back wall of the electrical box. The plate member further includes a slot disposed along the bending line of the support member and proximate the top wall of the electrical box.

An embodiment of a support bracket for supporting an electrical box has been disclosed. The support bracket includes a plate member and a cable management member. The cable management member extends laterally from the plate member, the cable management member forming at least one pass-through opening sized to receive an electrical cable that is further received in the electrical box. The plate member further includes a bending line that divides the plate member into a first portion and a second portion. The plate member has first and second configurations. The plate member is generally planar in the first configuration. When the plate member is in the second configuration, the first portion of the plate member bends along the bending line and extends laterally from the second portion to engage a wall opposing a back wall of the electrical box.

Optionally, the support bracket further includes at least one clip sized to slidably couple the support bracket to the electrical box. The plate member includes a lower section and an upper section opposing the lower section, the at least one clip including a plurality of clips positioned at the lower section and formed integrally with the plate member, the plurality of clips bending out of plane from the plate member and sized to engage a connector mounting base. The at least one clip extends from the plate member and is resiliently deflectable relative to the plate member. The plate member includes a proximate end and a distal end opposing the proximate end, the plate member further including a plurality of locator tabs extending from the proximate end and sized to be received in a plurality of slots disposed on a top wall of the electrical box. The plate member includes a proximate end and a distal end opposing the proximate end, the plate member further includes a main member and a support member, the support member surrounds the main member on lateral sides of the main member and forms the distal end of the plate member and two lateral gaps between the support member and the main member, and the bending line is disposed outside the two lateral gaps and proximate the proximate end.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electrical box assembly to be mounted on a first wall, comprising:
   an electrical box having a top wall, a bottom wall opposing the top wall, and a back wall; and
   a support bracket positioned proximate the back wall of the electrical box and coupled to the electrical box, the support bracket comprising a plate member and a cable management member extending laterally from the plate member, the cable management member forming at least one pass-through opening sized to receive an electrical cable that is further received in the electrical box, the plate member comprising a bending line that divides the plate member into a first portion and a second portion, the bending line extending substantially parallel with a part of the cable management member that forms the pass-through opening, wherein the plate member has first and second configurations, the plate member is generally planar in the first configuration, and when the plate member is in the second configuration the first portion of the plate member bends along the bending line and extends laterally from the second portion to engage a second wall opposing the first wall and opposing the back wall of the electrical box, the first portion of the plate member and the cable management member extending away from opposite faces of the second portion of the plate member.

2. The electrical box assembly of claim 1, wherein the support bracket further comprises at least one clip sized to slidably couple the support bracket to the electrical box.

3. The electrical box assembly of claim 2, further comprising a connector mounting base positioned above and attached to the top wall of the electrical box, wherein the clip is sized to slidably engage the support bracket to the connector mounting base.

4. The electrical box assembly of claim 3, wherein the plate member includes a lower section proximate the top wall of the electrical box and an upper section opposing the lower section, the at least one clip comprising a plurality of clips positioned at the lower section and formed integrally with the plate member, the plurality of clips bending out of plane from the plate member and engaging the connector mounting base.

5. The electrical box assembly of claim 3, wherein the at least one clip extends from the plate member and is resiliently deflectable relative to the plate member.

6. The electrical box assembly of claim 1, wherein the support bracket is entirely positioned above the electrical box.

7. The electrical box assembly of claim 1, wherein the plate member includes a main member and a support member, the support member surrounds the main member on lateral sides of the main member and forms two lateral gaps between the support member and the main member, and the bending line is disposed below the two lateral gaps.

8. An electrical box assembly to be mounted on a first wall, comprising:
   an electrical box having a top wall, a bottom wall opposing the top wall, and a back wall;
   a connector mounting base positioned above and attached to the top wall of the electrical box, the connector mounting base comprising a front facing in the opposite direction from the back wall of the electrical box and a back opposing the front, wherein the connector mounting base is sized to receive an electrical cable; and
   a support bracket positioned above the electrical box and proximate the back wall of the electrical box and the back of the connector mounting base, the support bracket indirectly coupled to the electrical box through the connector mounting base, the support bracket comprising a plate member and a cable management member extending laterally from the plate member, the cable management member forming a pass-through opening sized to receive an electrical cable that is further received in the connector mounting base and further in the electrical box, wherein the support bracket further comprises at least one clip sized to slidably engage the support bracket to the connector mounting base.

9. The electrical box assembly of claim 8, wherein the plate member includes a lower section proximate the top wall of the electrical box and an upper section opposing the lower section, the at least one clip comprising a plurality of clips positioned on the lower section of the plate member and formed integrally with the plate member, the plurality of clips bending out of plane from the plate member and engaging the connector mounting base.

10. The electrical box assembly of claim 8, wherein the at least one clip extends from the plate member and is resiliently deflectable relative to the plate member.

11. The electrical box assembly of claim 8, wherein the plate member includes a main member and a support member, the support member surrounding the main member on lateral sides of the main member and forming two lateral gaps between the support member and the main member, the support member further comprising a bending line that is disposed below the two lateral gaps and divides the support member into a first portion and a second portion, wherein the plate member has first and second configurations, the plate member is generally planar in the first configuration, and when the plate member is in the second configuration the first portion of the support member bends along the bending line and extends laterally from the second portion of the support member to engage a second wall opposing the first wall and opposing the back wall of the electrical box.

12. The electrical box assembly of claim 11, wherein the plate member further comprises a slot disposed along the bending line of the support member and proximate the top wall of the electrical box.

13. A support bracket for supporting an electrical box, comprising:
   a plate member; and
   a cable management member extending laterally from the plate member, the cable management member forming at least one pass-through opening sized to receive an electrical cable that is further received in the electrical box, wherein the plate member further comprises a bending line that divides the plate member into a first portion and a second portion, the bending line extending substantially parallel with a part of the cable management member that forms the pass-through opening, wherein the plate member has first and second configurations, the plate member is generally planar in the first configuration, and when the plate member is in the second configuration the first portion of the plate member bends along the bending line and extends laterally from the second portion to engage a wall opposing a back wall of the electrical box, the first portion of the plate member and the cable management member extending away from opposite faces of the second portion of the plate member.

14. The support bracket of claim 13, further comprising at least one clip sized to slidably couple the support bracket to the electrical box.

15. The support bracket of claim 14, wherein the plate member includes a lower section and an upper section opposing the lower section, the at least one clip comprising a plurality of clips positioned at the lower section and formed integrally with the plate member, the plurality of clips bending out of plane from the plate member and sized to engage a connector mounting base.

16. The support bracket of claim 14, wherein the at least one clip extends from the plate member and is resiliently deflectable relative to the plate member.

17. The support bracket of claim 13, wherein the plate member includes a proximate end and a distal end opposing the proximate end, the plate member further includes a main member and a support member, the support member surrounds the main member on lateral sides of the main member and forms the distal end of the plate member and two lateral gaps between the support member and the main member, and the bending line is disposed outside the two lateral gaps and proximate the proximate end.

\* \* \* \* \*